United States Patent [19]

Shinoda et al.

[11] 4,167,312
[45] Sep. 11, 1979

[54] EXPOSURE CONTROL CIRCUIT FOR A CAMERA

[75] Inventors: Nobuhiko Shinoda, Tokyo; Nobuaki Sakurada, Yokohama; Masaharu Kawamura, Hino; Tadashi Ito, Yokohama; Hiroyashu Murakami, Tokyo; Fumio Ito, Yokohama, all of Japan

[73] Assignee: Canon Kabushiki Kaisha, Tokyo, Japan

[21] Appl. No.: 888,622

[22] Filed: Mar. 21, 1978

Related U.S. Application Data

[63] Continuation of Ser. No. 698,537, Jun. 22, 1976, abandoned.

[30] Foreign Application Priority Data

Jun. 24, 1975 [JP] Japan .................................. 50-79016

[51] Int. Cl.² ............................................. G03B 7/08
[52] U.S. Cl. .................................. 354/23 D; 354/38; 354/50; 354/60 A
[58] Field of Search .................... 354/23 D, 38, 50, 51, 354/60 A

[56] References Cited

FOREIGN PATENT DOCUMENTS 2434152  2/1975  Fed. Rep. of Germany ........ 354/23 D

*Primary Examiner*—Russell E. Adams
*Attorney, Agent, or Firm*—Toren, McGeady and Stanger

[57] ABSTRACT

A camera exposure control circuit performs exposure control and a series of photographic functions digitally by means of digital operation process circuits and a sequence control circuit. In the sequence control circuit a random logic circuit is used to control the camera in an efficient way and to minimize the number of the components of the camera itself.

8 Claims, 22 Drawing Figures

FIG. 1

| APEX VALUE Tv | APEX EQUIVALENT VALUE Tv+α | TR8 | TR4 | TR2 | TR1 | TIME | APEX VALUE Av (AR) | AR8 | AR4 | AR2 | AR1 | F NUMBER | APEX VALUE Ev | APEX EQUIVALENT VALUE Ev+α | 8 | 4 | 2 | 1 |
|---|---|---|---|---|---|---|---|---|---|---|---|---|---|---|---|---|---|---|
| -4 | 0 | 0 | 0 | 0 | 0 | 16 | 0 | 0 | 0 | 0 | 0 | 1.0 | -4 | 0 | 0 | 0 | 0 | 0 |
| -3 | 1 | 0 | 0 | 0 | 1 | 8 | 1 | 0 | 0 | 0 | 1 | 1.4 | -3 | 1 | 0 | 0 | 0 | 1 |
| -2 | 2 | 0 | 0 | 1 | 0 | 4 | 2 | 0 | 0 | 1 | 0 | 2.0 | -2 | 2 | 0 | 0 | 1 | 0 |
| -1 | 3 | 0 | 0 | 1 | 1 | 2 | 3 | 0 | 0 | 1 | 1 | 2.8 | -1 | 3 | 0 | 0 | 1 | 1 |
| 0 | 4 | 0 | 1 | 0 | 0 | 1 | 4 | 0 | 1 | 0 | 0 | 4.0 | 0 | 4 | 0 | 1 | 0 | 0 |
| 1 | 5 | 0 | 1 | 0 | 1 | 1/2 | 5 | 0 | 1 | 0 | 1 | 5.6 | 1 | 5 | 0 | 1 | 0 | 1 |
| 2 | 6 | 0 | 1 | 1 | 0 | 1/4 | 6 | 0 | 1 | 1 | 0 | 8.0 | 2 | 6 | 0 | 1 | 1 | 0 |
| 3 | 7 | 0 | 1 | 1 | 1 | 1/8 | 7 | 0 | 1 | 1 | 1 | 11.0 | 3 | 7 | 0 | 1 | 1 | 1 |
| 4 | 8 | 1 | 0 | 0 | 0 | 1/16 | 8 | 1 | 0 | 0 | 0 | 16.0 | 4 | 8 | 1 | 0 | 0 | 0 |
| 5 | 9 | 1 | 0 | 0 | 1 | 1/32 | 9 | 1 | 0 | 0 | 1 | 22.0 | 5 | 9 | 1 | 0 | 0 | 1 |
| 6 | 10 | 1 | 0 | 1 | 0 | 1/64 | 10 | 1 | 0 | 1 | 0 | 32.0 | 6 | 10 | 1 | 0 | 1 | 0 |
| 7 | 11 | 1 | 0 | 1 | 1 | 1/128 | | | | | | | 7 | 11 | 1 | 0 | 1 | 1 |
| 8 | 12 | 1 | 1 | 0 | 0 | 1/256 | | | | | | | 8 | 12 | 1 | 1 | 0 | 0 |
| 9 | 13 | 1 | 1 | 0 | 1 | 1/512 | | | | | | | 9 | 13 | 1 | 1 | 0 | 1 |
| 10 | 14 | 1 | 1 | 1 | 0 | 1/1024 | | | | | | | 10 | 14 | 1 | 1 | 1 | 0 |
| 11 | 15 | 1 | 1 | 1 | 1 | 1/2048 | | | | | | | 11 | 15 | 1 | 1 | 1 | 1 |

EXPOSURE CONTROL CIRCUIT FOR A CAMERA

This is a continuation of application Ser. No. 698,537 filed June 22, 1976, now abandoned.

FIELD OF THE INVENTION

The present invention relates to a camera exposure control device particularly for controlling the exposure operation as well as the exposure control motion.

DESCRIPTION OF THE PRIOR ART

Until now exposure circuits which determine exposures digitally and exposure control devices which perform an exposure control motion by means of a sequence control circuit have been known. The exposure control motion is divided into small units and controlled sequentially by advancing a ratchet switch corresponding to the steps. Signals whose number corresponds with that of the steps and the control motions are delivered to the ratchet switch. In consequence the number of the signal lines leading to the ratchet switch is quite large. In an actual camera it is impossible to realize the sequence control unless the control is carried out with a CPU by means of a micro-program. This is very inconvenient.

In a conventional exposure control the photographic APEX operation is carried out by means of an analog operation circuit and only the result of the operation is converted into a digital value. To apply the operation circuit to the exposure control device by means of which the exposure control motion is controlled by means of a digital circuit in a way of sequence as mentioned above it is essential to make the analog control unit watch with the digital control unit, which is very inconvenient. It can also be thought out that in order to eliminate the above mentioned shortcomings all the exposure informations are converted into the digital informations in such a manner that the APEX operation is carried out in a digital way whereby an analog-into-digital conversion circuits corresponding with the numbers of the exposure informations become necessary only to increase the cost, which is also inconvenient.

SUMMARY OF THE PRESENT INVENTION

A purpose of the present invention is to offer an exposure control device by means of which the exposure control motion can be carried out without CPU in a way of sequence.

Another purpose of the present invention is to offer an exposure control device by means of which the exposure operation as well as the exposure control motion can be controlled by means of a digital circuit in a way of sequence.

Further another purpose of the present invention is to offer an exposure control device by means of which a plural number of the exposure informations can be converted into digital values by means of a single A-D conversion circuit.

Further another purpose of the present invention is to offer an automatic exposure control device which is so designed that the steps for various exposure control can be automatically taken by composing almost all of the control circuit with the digital electrical circuits which can be integrated and applying the sequence control means to the control circuits, whereby the device can easily applied to the single reflex camera with TTL light measuring system and can be manufactured in series so as to be able to realize a compact and economical equipment.

Further another purpose of the present invention is to offer an exposure control device in which the all electrical circuits, especially almost all the circuits are composed with the large scale IC circuit in such a manner that the device can be made compact with a reduced cost, a high fidelity and an improved devability, a remarkably superior information operation accuracy.

Further another purpose of the present invention is to offer an automatic exposure control device in which the exposure time and the aperture value can be treated equivalently to each other in the exposure operation so that depending upon the development of the system the device can be designed in such a manner that the aperture value priority mode and the exposure time priority mode can be freely selected by means of a change over switch.

Further, other purposes of the present invention will be disclosed out of the explanations to be made later in detail in accordance with the accompanying drawings.

BRIEF DESCRIPTION OF THE DRAWINGS

FIG. 1 shows a table of APEX values (Tv)—Values corresponding to APEX-values (Tv+α)—Digital codes to be applied to the automatic exposure control device in accordance with the present invention.

DESCRIPTION OF THE PREFERRED EMBODIMENT

The disclosed embodiments relate not only to automatic exposure control methods and means with priority on the exposure time, i.e., shutter speed, but also on the aperture value.

In the embodiments below the informations for controlling the exposure are processed in the informations with 4 bits, whereby the mechanism as well as the operation process becomes complicated in order to process informations extended into the negative range of APEX value in a digital way and further the practical exposure control range covers for example $-4-+11$ for the exposure amount (APEX Ev), $-4-+11$ for the exposure time, and 1-10 for the aperture so that the APEX values capable of being represented by digital values with 4 bits are beyond practical range in the positive range. In consequence in case of the embodiments to be explained below the informations for controlling the exposure are treated in the digital values or the analog values corresponding to the digital values as is shown in FIG. 1. Namely for the exposure amount and the exposure time the APEX values added with the compensation amount "4" are treated as control values. In the following explanation the informations for controlling the exposure, being represented in the numerical values "0"–"15" as is shown in FIG. 1 are called the values corresponding to the APPEX values.

Figure 2A:
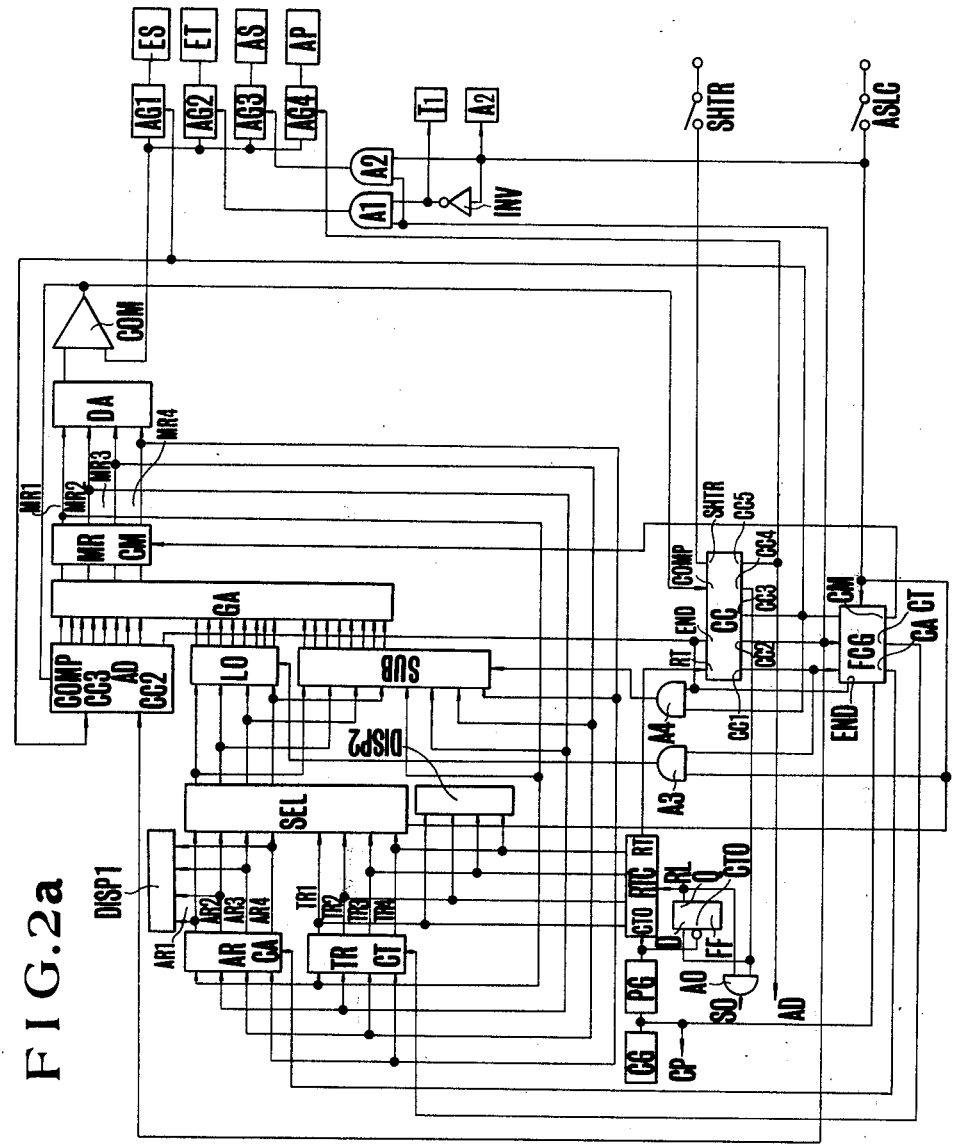
FIG. 2(a) shows a block circuit diagram of an embodiment of the automatic exposure control device in accordance with the present invention.
Figure 2B:
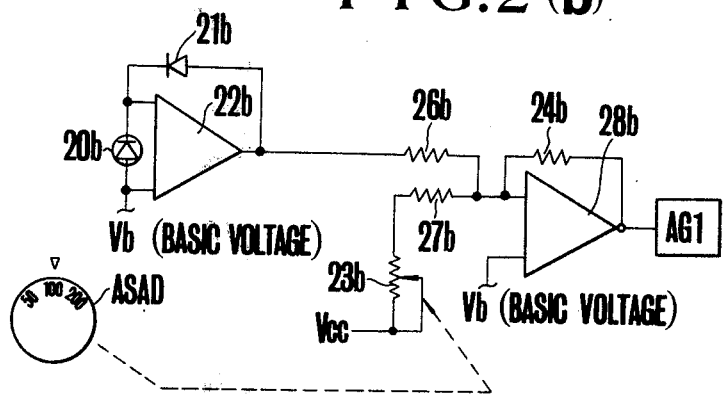
FIG. 2(b) shows an embodiment of the circuit ES shown in FIG. 2(a).
Figure 2C:
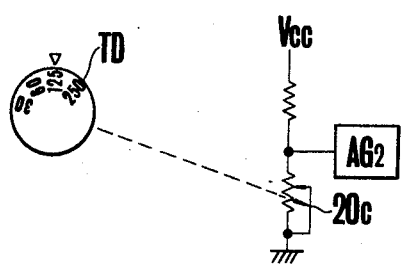
FIG. 2(c) shows an embodiment of the circuit ET shown in FIG. 2(a).
Figure 2D:
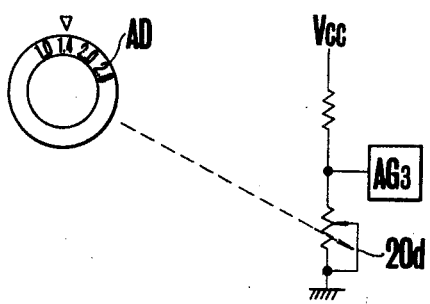
FIG. 2(d) shows an embodiment of the circuit AS shown in FIG. 2(a).
Figure 2E:
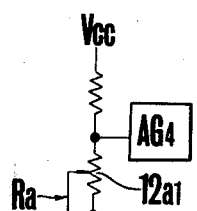
FIG. 2(e) shows an embodiment of the circuit AP shown in FIG. 2(a).

FIG. 2(a) shows a block circuit diagram of an embodiment of the automatic exposure control device for carrying out the automatic exposure control method in accordance with the present invention. Here an exposure amount (i.e., value) converting circuit ES converts the exposure necessary for photographic film into an analog value representing to the value (Ev+α) corresponding to the APEX value of FIG. 1. The exposure needed is obtained by processing the output of the object brightness measuring means (FIG. 2(b)) for detecting the brightness of the object to be photographed and that of a film sensitivity setting means (FIG. 2(b)) for setting the sensitivity of the photographic film. An exposure time information input circuit ET receives the output of exposure time (shutter speed) setting means (FIG. 2(c)) composed of a variable resistance and so on for producing an analog signal corresponding to the so called value (Tv+α) corresponding to the APEX value as is shown in FIG. 1. A set aperture information input circuit AS receives the output of the aperture setting means (FIG. 2(d)) composed of a variable resistance and so on for producing an analog signal corresponding to the APEX value of the aperture value so as to set the aperture value of the photographic lens. A detected aperture information input circuit AP receives the output of the aperture detecting means composed of a variable resistance and so on for producing an analog signal corresponding to the APEX value AVR of the actual aperture value of the photographic lens. An analog gate AG1 switches the input signal from the exposure amount converting circuit ES on and off. An analog gate AG2 turns the input signal from the above mentioned exposure time information input circuit ET on and off. An analog gate AG3 switches the output of the set aperture information input circuit AS on and off. An analog gate AG4 switches the output of the aperture information input circuit AP on and off. A comparator COM has one terminal supplied with the output of either of the analog gates AG1, AG2, AG3 and AG4 and another terminal supplied with the analog output of D-A converter DA to be explained later. A register MR forms 4 bit outputs MR1, MR2, MR3 and MR4 respectively with weight "1", "2", "3" and "4". A D-A converter DA converts the content of the above mentioned register MR into an analog value. A register AR presenting 4 bit outputs AR1, AR2, AR3 and AR4 respectively with weight "1", "2", "3" and "4" takes up the output data of the above mentioned register MR in accordance with the signal input to a control terminal CA. A register TR forms 4 bit outputs TR1, TR2, TR4 and TR8 respectively with weight "1", "2", "4" and "8" for taking up the output data in accordance with the signal input to the control terminal CT.

A first display means DISP1 converts the data of the above mentioned register AR into the desired digital data digital display. A second display means DISP2 converts the data of the register TR into the desired digital data so as to be displayed digitally. A selection means SEL serves for selectively taking up the output of the registers AR, TR. A subtraction means SUB is supplied with the output of the register MR and of the selection means SEL so as to subtract the output of the selection means from the content of the register MR. A load circuit LO serves for transferring the output of the selection means SEL to the register MR. A conversion control means AD serves for carrying out the A-D conversion function of successive approximation type together with the register MR1 the D-A converter DA and the comparator COM.

A gate circuit GA serves for taking up the output of what produces the output among the subtraction means SUB, the load circuit, and the A-D conversion control means AD into the register MR. A clock pulse generator serves for generating the clock pulses CP as a standard for the whole device.

Reference character PG denotes a dividing circuit for converting the output pulses of the above mentioned clock pulse generator CG into the standard pulses CTO necessary for controlling the exposure time, RTC an exposure time control circuit for obtaining the actual exposure time from the exposure time information given in the digital value corresponding to a value corresponding to the APEX value, CC a control counter for supplying the sequence control signal CC1, CC2, CC4 and CC5 to the whole device, and FCG a fetch circuit for producing the control clock signals CA, CT and CM for each register AR, TR, MR in accordance with the output of the above mentioned control counter CC and the clock pulse generator CG. Member ASLC is a priority selection switch to be closed in case of priority on aperture and to be opened in case of the priority on exposure time, AI an aperture priority display means for displaying that the device is set for aperture priority in accordance with the signal of the priority selection switch ASLC, TI an exposure priority display means for displaying that the device is set for exposure time or shutter priority in accordance with the signal from the above mentioned priority selection switch ASLC through the inverter INV, SHTR a release switch to be closed at the time of the shutter release, A1 an AND gate for applying the logical product of the control signal CC2 with the inverted signal of the output of the priority selection switch ASLC obtained through the inverter INV to the analog gate AG2 as gate signal, and A2 an AND gate for applying the logical product of the control signal CC2 with the output of the priority selection switch ASLC to the analog gate AG3 as gate signal, A3 an AND gate for applying the logical product of the control signal CC1 with the output of the priority selection switch ASLC to the load circuit LO as control signal, A4 the AND gate for giving the product of the control signal CC3 with the END signal produced by the A-D conversion control circuit AD as the signal for the completion of the A-D conversion to the subtraction circuit SUB as control signal. Member FF serves as a Flip-Flop whose clock input is supplied with the output CTO of the above mentioned standard time generating circuit PG and whose D input is supplied with the control signal CC4 so as to obtain the control signal RL of the exposure time control circuit RTC, and AO as an AND gate supplied with the output signal RL of the above mentioned Flip-Flop FF and the control signal CC4 so as to produce the shutter opening signal SO.

The register AR stores the digital value of the value AV corresponding to the APEX value of the aperture value while the register TR stores the digital value of the value corresponding to the APEX value of the exposure time.

Figure 3:
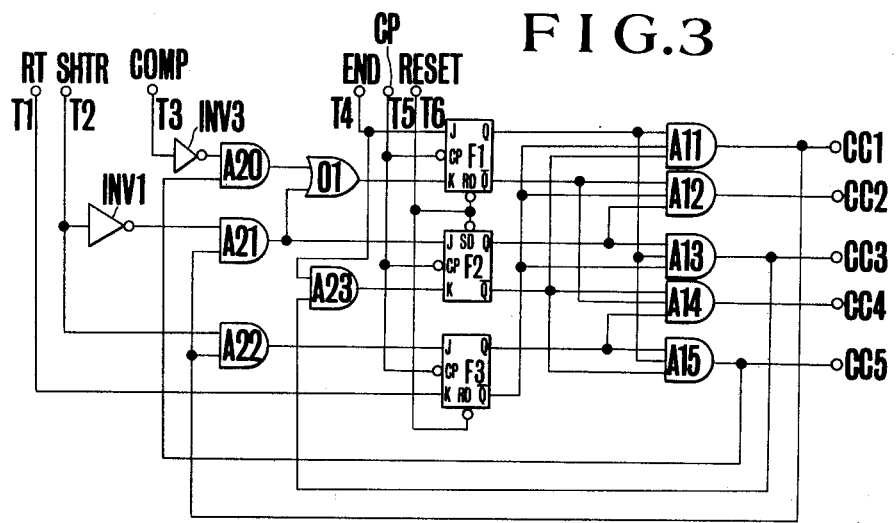
FIG. 3 shows an embodiment of the control counter CC shown in FIG. 2(a).

FIG. 3 shows an embodiment of the control counter CC shown in FIG. 2(a). Here an input terminal T1 receives the signal RT indicating completion of the exposure time counting and coming from the exposure time control circuit RTC. Member T2 represents the input terminal of the shutter release signal coming from the release switch SHTR, T3 the input terminal for the output signal COMP of the comparator COM, T4 the input terminal for the END signal of the completion of the A-D conversion from the A-D conversion control circuit AD, T5 the input terminal for the clock pulse CP coming from the clock pulse generating means CG, and T6 the input terminal for the initial reset signal RESET necessary for the next exposure control. The latter is necessarily produced by an exposure control such as the completion of the film winding. Flip Flops F1, F2 and F3 respectively include input terminals JK, a clock input terminal CP, set direct terminals SD, and reset direct terminals RD, Q and $\overline{Q}$. An AND gate A11 receives the Q output of the Flip Flop F1 and the output $\overline{Q}$ of the Flip-Flops F2, F3 so as to produce the control signal CC1. An AND gate A12 receives the $\overline{Q}$ output of the Flip-Flops F1, F3 and the $\overline{Q}$ output of the Flip Flop F2, so as to produce the control signal CC2. An AND gate A13 receives the Q output of the Flip Flops F1 and F2 and the $\overline{Q}$ output of the Flip Flop F3 so as to produce the control signal CC3. An AND gate A14 receives the $\overline{Q}$ output of the Flip Flops F1 and F2 and the Q output of the Flip Flop F3 so as to produce the control signal CC4 and an AND gate A15 receives the Q output of the Flip Flops F1 and F3 and the Q output of the Flip Flop F2 so as to produce the control signal CC5.

The J input terminal of the Flip Flop F1 receives the END signal of the A-D conversion completion through the input terminal T4.

The K input terminal receives either or both of the outputs of AND gates A20 and A21 through OR gate 01. The AND gate A20 furnishes the logic product of the inverted form $\overline{COMP}$ of the output COMP of comparator COM supplied through the input terminal T3 and the control signal CC5. The AND gate A21 furnishes the logic product of the inverted form $\overline{SHTR}$ of the release signal SHTR supplied through the input terminal T2 and the control signal CC1. Further the J input terminal of the Flip Flop F2 is supplied with the output signal of the above mentioned AND gate A21. An AND gate the K input terminal with the logic product of the control signal CC3 and the END signal of the A-D conversion completion.

An AND gate A22 furnishes the J input terminal of the Flip Flop F3 with the logic product signal of the release signal SHTR supplied through the input terminal T2 and the control signal CC1. The K terminal is supplied with the END signal RT indicating the exposure completion at the input terminal T1. Further the initial reset signal RESET supplied through the input terminal T6 is applied to the reset direct terminals of the Flip Flops F1, F3 and to the set direct terminal of the Flip Flop F2.

The control signal CC1 among the thus obtained control signals CC1, CC2, CC3, CC4 and CC5 is applied to the fetch circuit FCG and at the same time to the load circuit through the AND gate A3. Further the control signal CC2 is applied to the fetch circuit and the A-D conversion (i.e. converter) circuit AD and to the analog gate AG2 through the AND gate A1. The control signal CC3 passes to the fetch circuit FCG, the analog gate AG1 and the A-D converter circuit AD and at the same time to the subtraction circuit SUB through the AND gate A4. The control signal CC4 is supplied to the input D of the Flip Flop FF and at the same time to the AND gate A0. The control signal CC5 passes to the analog gate AG4 and at the same time serves as the diaphragm driving signal.

Figure 4:
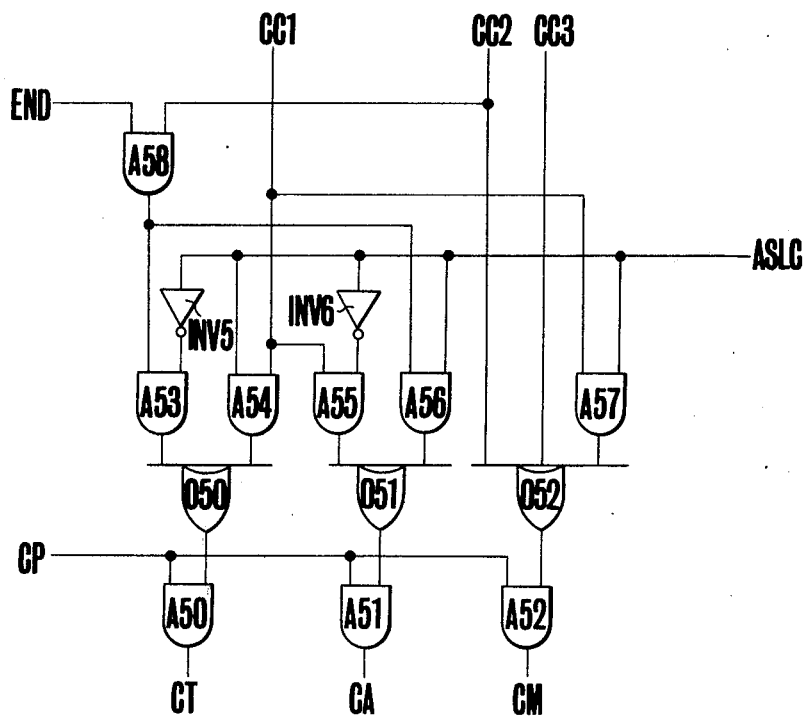
FIG. 4 shows an embodiment of the fetch circuit FCG shown in FIG. 2(a).

FIG. 4 shows an embodiment of the fetch circuit FCG shown in FIG. 2(a). Here the control clock signal CT for the register TR is obtained through the OR gate 050 when either of the AND gates A53 or A54 turns on or goes high (logically, i.e. produces a logic "1" output) and the AND gate A50 is supplied with the clock pulses CP at its other input terminal. The AND gate A53 goes high at its output after the the inverter INV5 has inverted a low zero aperture priority selection signal ASLC and the logical product of the END signal of the A-D conversion and the control signal CC2 is "1" at the AND gate A58. The output of AND gate A54 is "1" when it receives the aperture priority selection signal ASLC and the control signal CC1. Further the control clock signal CA for the register AR can be obtained when the OR gate 051 passes one of the outputs of the above mentioned AND gates A55, A56 to the AND gate A51 and the latter is supplied with the clock pulses CP. The output of AND gate goes high when the the aperture priority selection signal ASLC and END signal appearing at gate A58 as well as the control signal CC2 at the AND gate A58 are all high (i.e. "1"). The gate 55 goes high when it receives a high inverted (by INVG) aperture priority selection signal ASLC and a high control signal CC1. Further the control clock signal CM for the register MR can be obtained when CP and the output the OR gate 052 are both high. The latter is high when both the control signal CC1 and the aperture priority selection signal ASLC appears high at the AND gate 57, or when either of the control signals CC2, CC3 is high.

Figure 5:
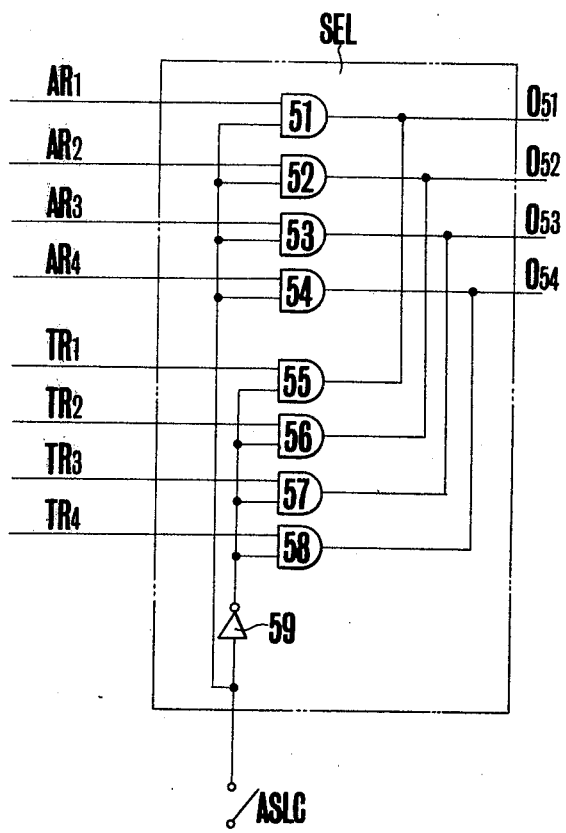
FIG. 5 shows an embodiment of the circuit of the selection means SEL shown in FIG. 2(a).

FIG. 5 shows an embodiment of the circuit of the selection means SEL shown in FIG. 2(a). Here, AND gates 51–58 each have one of their input terminals connected with the output terminals AR1–AR4 and their other input terminals connected with the switch ASLC. Further one of the input terminals of the AND gates 55-58 is connected to the output terminals of the register TR while the other input terminal is connected to the switch ASLC through the inverter 59.

Figure 6:
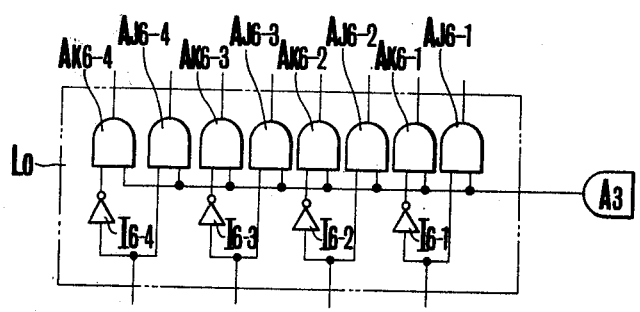
FIG. 6 shows an embodiment of the load circuit shown in FIG. 2(a).
Figure 7:
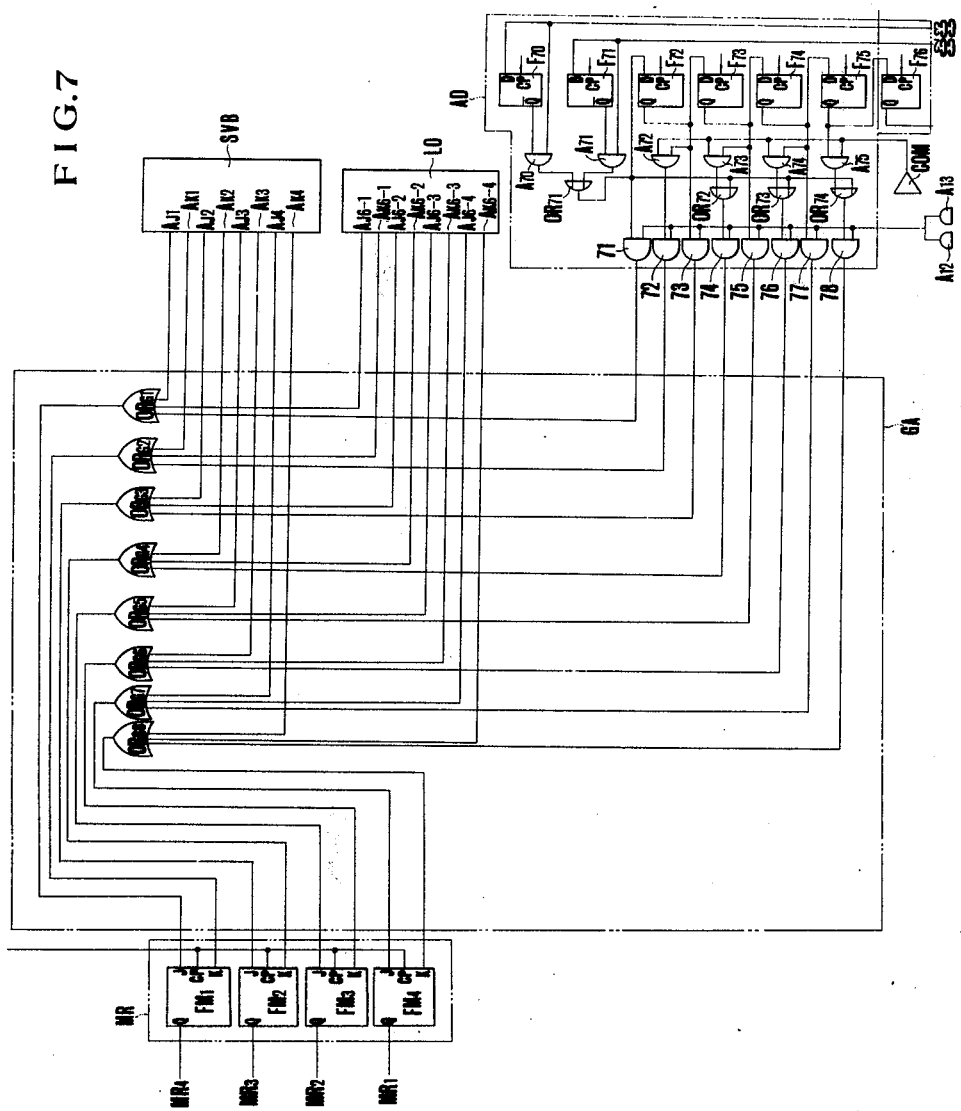
FIG. 7 shows an embodiment of the A-D converting means AD, the gate circuit AG and the register MR shown in FIG. 2(a).

FIG. 6 shows an embodiment of the load circuit shown in FIG. 2(a). Here AND gates AJ6-1-AK6-4 each have one of the input terminals connected to the AND gate A3 and the other input terminals are connected to the output terminal of the selection means and of the inverters I6-1-I6-4. FIG. 7 shows an embodiment of the A-D converting or converter means AD, the gate circuit AG and the register MR shown in FIG. 2(a). In the A - D converting means an AND gate A70 has one input terminal connected to the Q output of the Flip Flop F70 and the other input terminal connected to the terminal CC3 Four AND gates A72-A75 each have one input terminal connected to the output terminal of the above mentioned comparison circuit COM and whose other input terminals are respectively connected to the Q output terminals of the Flip Flops F72-F75. An OR gate OR71 has respective input terminal connected to the AND gates A70-A71. Each of three OR gates OR72-OR74 has one of its input terminals connected to the OR gate OR71 and the other of its input terminals respectively connected to the AND gates A73-A75. Each of eight AND gates 71-78 has one of its input terminals connected to the above mentioned AND gates A12, A13.

The gate circuit GA consists of the OR gates ORG-1-ORG8. The register MR consists of the JK Flip Flops FM1-FM4. The J terminal of the Flip Flop FM1 is connected to ORG1 while the K terminal is connected to ORG2. The J terminal of FM2 is connected to ORG3 while the K terminal is connected to ORG4. The J terminal of FM3 is connected to ORG5 while the K terminal is connected to ORG6. The J terminal of FM4 is connected to ORG7 while the K terminal is connected to ORG8. The clock terminals CP of the Flip Flops FM1-FM4 are connected to the above mentioned AND gate A52.

Figure 2F:
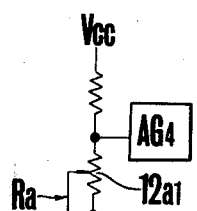
FIG. 2(f) shows an embodiment of the analog gate AG1-AG4 shown in FIG. 2(a).
Figure 8:
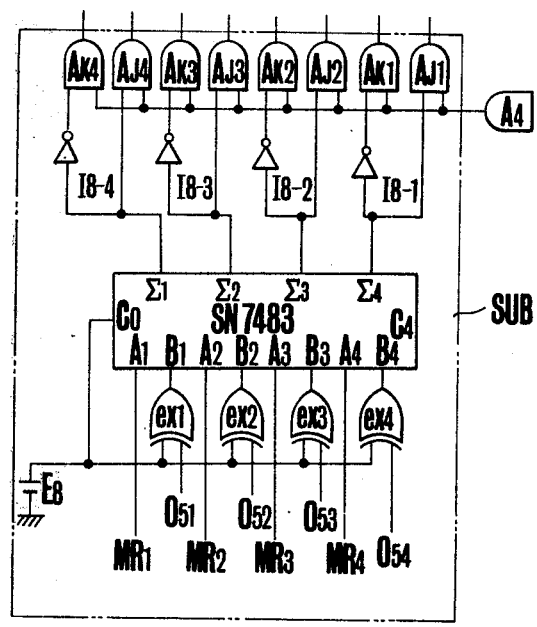
FIG. 8 shows an embodiment of the subtraction circuit SUB shown in FIG. 2(a).

FIG. 8 shows an embodiment of the subtraction circuit SUB in FIG. 2(a). Here, respective exclusive OR gates have one of their input terminals connected to the current source so as to be normally supplied with a logic "1". Each of the other input terminals is supplied with respective outputs 051-054 of the circuit SEL. Component SN7483 is a parallel binary addition and subtraction circuit available from the Texas Instrument Co., whose output terminals are connected to the above mentioned gate circuit GA through the AND gates AJ1-AK4. The other input terminals of the AND gates AJ1-AK4 are connected to the above mentioned AND gate A4. Components I8-1-I8-4 are inverters. FIGS. F2(b)-(e) respectively show the above mentioned circuits ES, ET, AS and AP, FIG. 2(f) an FET forming each of the analog gates AG1-AG4 and FIG. 2(g) details of the circuits TI and AI.

Figure 9:
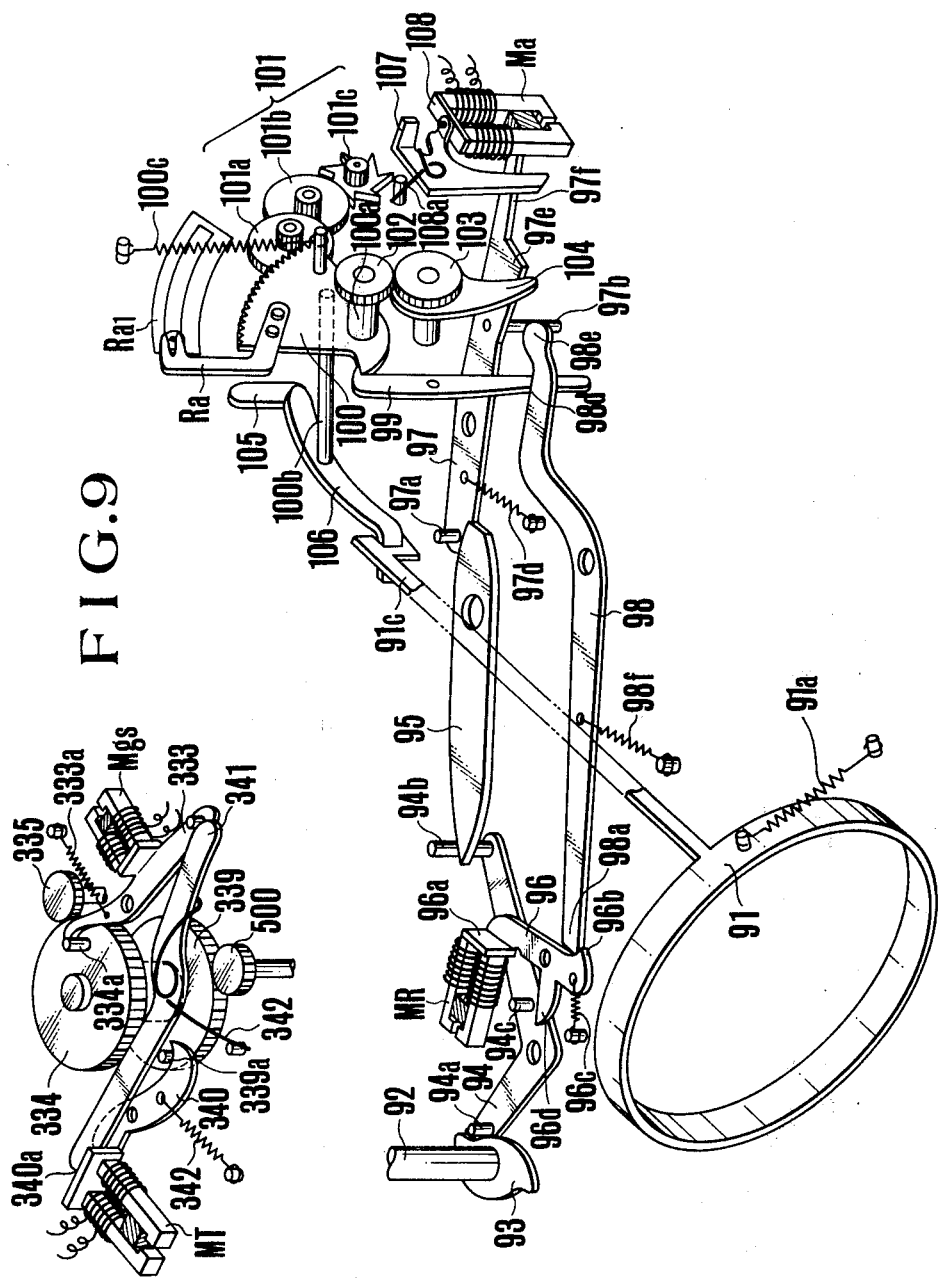
FIG. 9 shows the shutter mechanism and the diaphragm control mechanism to be applied to the present invention.

FIG. 9 shows the shutter mechanism and the diaphragm control mechanism to be applied to the present invention. Here an aperture preset ring is urged along the clockwise direction by means of a spring 91a. The ring 91 carries an arm 91c. A winding shaft 92 of a winding lever not shown in the drawing rotates a winding cam 93 fixed on its end. The cam 93 closes the reset switch RESW during the winding operation and opens the switch RESW at the end of the winding operation. An end of a rotatable intermediary (i.e. intermediate) lever carries a pin 94a which engages the winding cam 92. At the other end of the intermediary lever 94 a pin 94b engages one end of the second intermediary lever 95. The pin 94c on the intermediary lever 94 charges the first holding lever 96 is charged. The other end of the intermediary lever 95 is adapted to engage the pin 97a at one end of the rotatable charge lever 97. This charge lever 97 is urged along the counter clockwise direction by means of a spring 97d. A first holding MR with a permanent magnet engages one end 96a of the first holding lever 96 whose other end 96b engages one end 98a of a release lever 98 against the force of a spring 96c. Moreover rotation of the intermediary lever 94 engages the pin 94c on the lever 94 with one end surface 96d of the first holding lever 96. The ends 98d and 98e of a release lever 98 are positioned at one end of a rotatable EE holding lever 99 as well as of a pin 97b on the above mentioned holding lever 97. This release lever 98 is urged along the counter clockwise direction by means of a spring 98f. An EE sector gear 100 is kept at the other end of the holding lever 99. The sector gear 100 engages the gears 101a, 101b and the stop wheel 101c forming a speed adjusting mechanism 101 are engaged. The sector gear 100 is provided with a slide member Ra, which is in contact with a slide resistance Ra1.

The shaft 100a of the sector gear 100 is provided with a gear 102, with which an EE charge gear 103 is engaged. A lever 104 coaxially fixed on the gear 103 is in contact with another step 97e of the charge lever 97. The above mentioned sector gear 100 carries a pin 100b whose end surface is fixed to a signal lever 106 linked with a support lever 105. A bent end of this signal lever 106 holds the arm 91c of the preset ring 91. The EE sector gear 100 is strongly biased in the clockwise direction by means of the force of a spring 303a against the spring 100c biasing the sector gear 100.

A magnet MA for controlling the diaphragm serves to attract an iron plate 108 on a lever 107. This lever 107 to be attracted is urged in the counter clockwise direction by means of the spring 108a so that the bent end of the lever 107 can engage the stop wheel 101c of the speed adjusting mechanism 101. One branched end 97f of the charge lever 97 contacts the other end of the lever 107. An end of a front shutter plane (or curtain) holding lever being urged along the counter clockwise direction by means of the spring 333a engages a pin 334a on the front shutter plane gear 334. The other end of the lever 333 can be attracted by the shutter controlling magnet Mgs with a permanent magnet. This front shutter plane gear 334 engages the front shutter plane pinion of the front shutter plane (or curtain) drum not shown in the drawing.

A rear shutter plane (or curtain) gear 339 coaxial with the above mentioned front shutter plane gear 334 engages the rear shutter plane pinion 500 for the rear shutter plane drum not shown in the drawing. The rear shutter plane gear 339 carries a pin 339a. A lever 340 is rotated by means of the above mentioned pin 339a and is attracted by the shutter controlling magnet MT with the iron piece 340a.

A lever 341 serves for engaging the iron piece or plate 340a with electromagnet MT by means of the spring 342.

Figure 10:
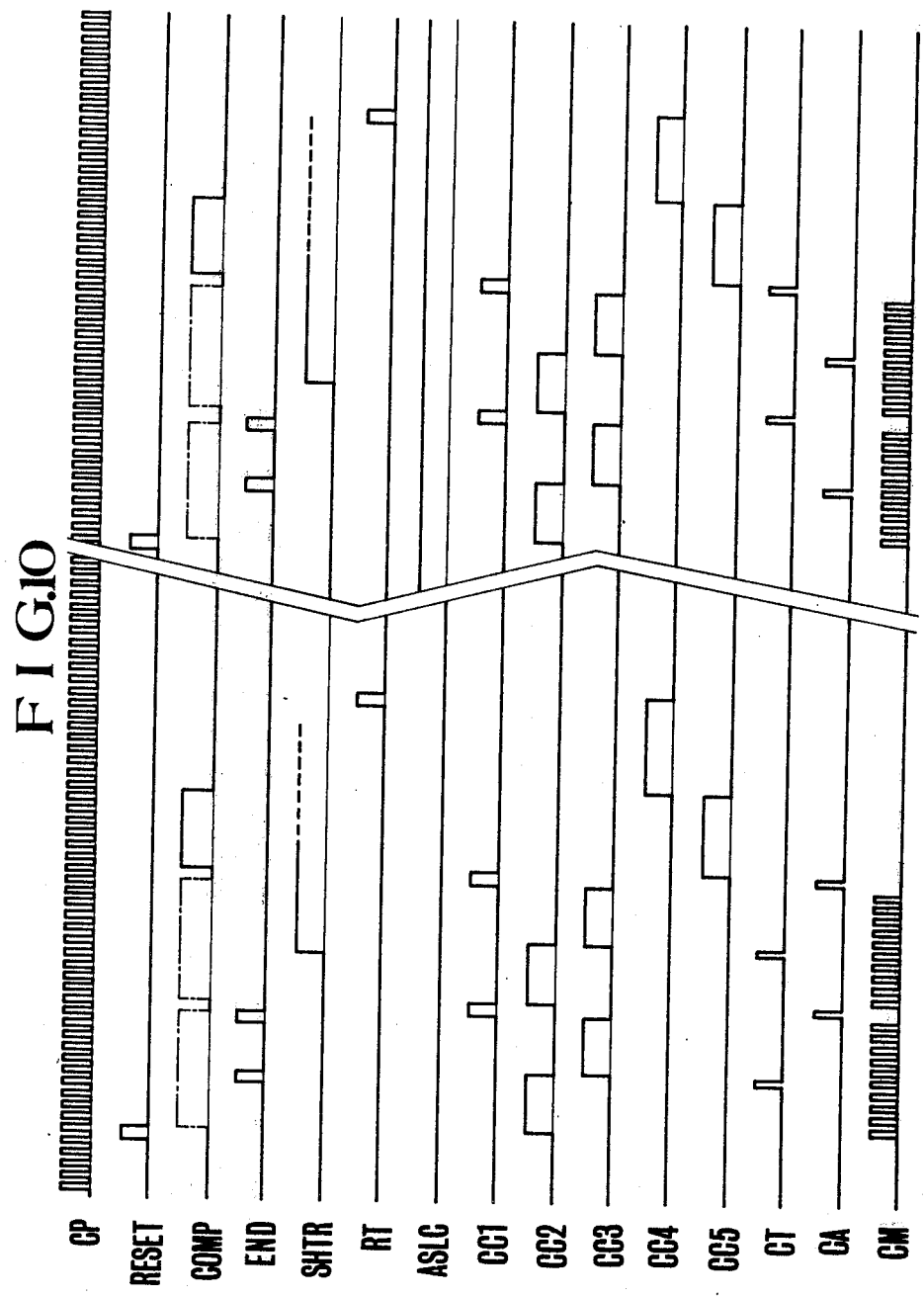
FIG. 10 shows the time chart for explaining the operation of the circuits shown in FIGS. 2(a), 3 and 4.

FIG. 10 shows the time chart for explaining the operation sequence of the circuits shown in FIG. 2(a), FIG. 3 and FIG. 4.

In operation let us suppose that the current source switch not shown in the drawing is closed and the shutter is charged or energized. Immediate closure of the switch RESW supplies the control counter CC shown in FIG. 3 with the reset signal RESET through the input terminal T6 in such a manner that in synchronization with the falling down of the signal the Flip Flops F1 and F3 whose reset direct terminals RD are supplied with the signal are brought into the reset state, namely the state in which the $\overline{Q}$ output is kept "1" while the Flip Flop F2 whose set direct terminal SD is supplied with the signal is brought into the set state, namely the state in which the Q output is kept "1". Thus "1" output, namely CC2 output is produced by the AND gate A12. This CC2 output is given to the AND gate A52 through the OR gate O52 of the fetch circuit FCG so that the AND gate A52 produces a signal output synchronized with the clock pulses CP, which signal output is given to the register MR as the control clock for it. As is clear from FIG. 2(a), the CC2 signal is at the same time given to the A - D conversion circuit AD and the AND gates A1 and A2, so that by means of the mode selection switch not shown in the drawing the shutter priority mode is selected and the switch ASLC is opened. In case the aperture priority selection signal ASLC is "0", the "1" signal is given to the analog gate AG2 through the AND gate A1 while in case the aperture priority mode is selected, the switch ASLC is closed and the aperture priority selection signal is "1", the "1" signal is given to the analog gate AG3 through the above mentioned AND gate A2. Thus the analog voltage corresponding to the value (Td+α) corresponding to the APEX value of the set exposure time signal produced by the circuit ET consisting of a variable resistance 20c whose value is changed in functional engagement with the shutter dial TD shown in FIG. 2(c), so as to assume the value corresponding to the set shutter time or the analog voltage corresponding to the APEX value AV of the set aperture value produced by the circuit AS consisting of a variable resistance 20d whose value is changed in functional engagement with the aperture set ring AD shown in FIG. 2(d) so as to assume the value corresponding to the set aperture value is given to the comparator COM through the analog gate AG2 or AG3. Because further the above mentioned signal CC2 is also given to the A - D conversion means AD (FIG. 7) the AND gates 71–78 are opened. Further at this time the signal CC2 is given to the D terminal of the Flip Flop F71 so that the Flip Flop F71 is set in synchronization of the clock, whereby the Flip Flop F71 is of D type and therefore set by one clock later so that a high level output is applied to the AND gate A71 from the Q output terminal of F71 during 1 clock in such a manner that through the OR gates OR71–OR74, the AND gates 71, 74, 76 and 78 and the OR gates ORG1, ORG4, ORG6 and ORG8 the output is supplied to the J terminal of the Flip Flop FM1 and the K terminal of the Flip Flop FM2–FM4 of MR, whereby FM1 is set while the FM2–FM4 are reset. Thus only the signal MR4 is produced, whereby the weight of MR4 is "8", that of MR3 "4", that of MR2 "2" and that of MR1 "1", so that the signal "MR4" is converted into an analog voltage with weight "8" by means of DA and compared with the output of ET or AS by means of the comparator COM. When the output of ET or AS is lower than that of DA, "1" is produced by COM, and supplied to the K terminal of FM1 through the AND gates A72, 72 and ORG2 so as to reset FM1. In case the output of ET or AS is higher than that of DA, COM produces "0" so that FM1 remains in the set state. After the state of FM1 is determined in this way, the state of FM2–FM4 are successively determined by means of the output of ET or AS in synchronization of the clock pulses in a similar way, whereby the analog voltage of ET or AS is converted into digital value. Hereby the A - D conversion method is what is known widely as successive comparison type A - D conversion, so that the explanation thereof is omitted here. When the A - D conversion has been terminated in this way, namely the Flip Flop in the last step of the above mentioned D type Flip Flops has produced the output, the output is given to the terminal T4 of the control counter CC as the END signal and applied to the J terminal of the Flip Flop F1. At the same time the END signal is given to the AND gate A58 of the fetch circuit FCG, to which AND gate A58 the control signal CC2 is given, so that the AND gate 58 produces a "1" output to be applied to the AND gates A53 and A56. Hereby the AND gate A53 is supplied with the aperture priority selection signal ASLC through the inverter INV while the AND gate A53 is directly supplied with the aperture priority selection signal so that in case the signal ASLC is "0" the AND gate A53 produces the "1" output while in case the signal ASLC is "1" the AND gate A53 produces the "1" output. In case the AND gate A53 produces the "1" output, the output is given to the AND gate A50 through the OR gate O50 so as to let the OR gate O50 produce the control clock CT synchronized with the clock pulses CP in such a manner that the exposure time of the value corresponding to the APEX value converted into a digital value by means of the above mentioned A - D conversion and stored in the register MR is transferred to the register TR. In case the AND gate A56 produces the "1" output, the output is given to the AND gate A51 through the OR gate O51 so as to let the OR gate O51 produce a control clock CA synchronized with the clock pulses CP in such a manner that the aperture value of the APEX value converted into a digital value by means of the above mentioned A - D conversion and stored in the register MR is transferred to the register AR.

On the other hand, the Flip Flop F1 whose J terminal is supplied with the END signal is set in synchronization of the falling down of the clock pulses CP so as to produce the Q output of "1" and therefore the Q outputs of the Flip Flops F1 and F2 are "1" while the $\overline{Q}$ output of the Flip Flop F3 is "1" so that the AND gate A13 produces the "1" output, namely the CC3 output. This CC3 signal is given to the AND gate A52 through the OR gate O52 of the fetch circuit FCG so that the AND gate A52 produces the CM signal synchronized with the clock pulses CP to be given to the register MR as control clock. Further this CC3 signal is given to the A - D conversion circuit AD and the analog gate AG1, whereby the A - D conversion circuit AD supplied with the CC3 signal starts the A - D conversion of the analog value of the value (Ev+α) corresponding to the APEX value of the exposure amount signal to be given to the comparator COM through the analog gate AG1 into a digital value to be stored in the register MR. Namely, by means of the CC3 signal AG1 is opened so that the analog voltage corresponding to the value (Ev+α) corresponding to the APEX value of the exposure amount signal from the circuit ES shown in FIG. 2(b) and including the light measuring circuit consisting of a light sensing element 20b, a diode 21b and an operation amplifier, the film sensitivity information input circuit consisting of the variable resistance 23b in functional engagement of the ASA dial ASAD so as to assume the set resistance value and the operation circuit consisting of resistances 26b, 27b, an operation amplifier 28b and a feed back resistance 24b is applied to the comparator COM, while by means of the CC3 signal the AND gates 71-78 are opened whereby the signal is applied to the D-terminal of the Flip Flop F70 of AD so that in a similar way as mentioned above the analog voltage from the circuit ES is converted into a digital value, which is stored in the register MR.

As mentioned above, the A - D conversion having been completed, the END signal is produced by the above mentioned A - D conversion circuit AD and applied to the K terminal of the Flip Flop F2 from the terminal T4 of the control counter CC through the AND gate A23 supplied with the CC3 signal. At the same time, the above mentioned END signal is given to the subtraction circuit SUB (FIG. 8) through the AND gate A4 supplied with the CC3 signal in such a manner that from the exposure amount data stored in the register MR either the set exposure time data stored in the register TR or the set aperture value stored in the register AR is subtracted whereby the result is stored in the register MR. Namely the END signal is produced when the Q outputs of the above mentioned Flip Flops F70-F75 are all "0", so that the AND gates 71-78 of the A - D conversion circuit AD are opened, and Lo produces no output while only the subtraction circuit SUB produces the output. Therefore, the information to be applied to the register MR through the OR gates ORG-1-ORG8 is the output of the subtraction circuit SUB. Further the above mentioned selection circuit gives out the content of the register TR as outputs 051-054 because the AND gates 55-58 are opened when as is shown in FIG. 5 the switch ASLC is opened, namely the ASLC1 signal is "0" and the content of the register AR as outputs 051-054 when the signal is "1" so that either the content of the register AR or that of the register TR is transferred to the subtraction circuit SUB. Namely when the content of the register TR is subtracted from that of the register MR the aperture value necessary for obtaining a proper exposure is taken up in the register while when the content of the register AR is subtracted from that of the register MR the exposure time necessary for obtaining the proper exposure is taken up in the register MR.

On the other hand, the Flip Flop F2 supplied with the END signal at the K-terminal is reset in synchronization of the falling down of the clock pulses CP so as to produce the $\overline{Q}$ output of "1", whereby the Flip Flop F1 produces the Q output of "1" while the Flip Flops F2 and F3 produce the $\overline{Q}$ output of "1", so that the AND gate A11 produces the "1" output, namely CC1 output. This CC1 signal is given to the AND gates A54, A55 and A57 of the fetch circuit FCG, whereby the AND gates A54 and A57 are supplied with the aperture priority selection signal ASLC while the AND gate A55 is supplied with the inverted signal of the aperture selection signal ASLC through the inverter INV6 so that when the ASLC signal is "0" the AND gate A55 produces the "1" output to be given to the AND gate 51 through the OR gate O51 in such a manner that the AND gate 51 produces the signal output Ca synchronized with the clock pulse CP, to be given to the register AR as control clock for the register, while when the ASLC signal is "1", the AND gates A54 and A57 produce the "1" output in such a manner that the "1" output of the AND gate A54 is given to the AND gate A50 through the OR gate O50 while the "1" output of the AND gate A57 is given to the AND gate A52 through the OR gate O52 so that the AND gate A50 produces the signal output CT synchronized with the clock pulses CP, to be given to the register TR as control clock for the register while the AND gate A52 produces a signal output CM synchronized with clock pulses CP, to be given to the register MR as control clock for the register.

When the aperture priority selection signal ASLC is "0", the fetch circuit FCG produces a control clock signal AC for the register AR so that the data, namely the aperture value of the APEX value obtained by the operation is transferred to the register AR from the register MR.

When the aperture priority selection signal ASLC is "1", the AND gate A3 supplied with the "1" input of the signal ASLC1 produces the "1" output by means of the CC1 signal, to be given to the load circuit LO (FIG. 6). On the other hand, the selection circuit SEL supplied with the "1" input of the signal ASLC is giving the content of the register AR selectively to the load circuit LO. Consequently, when the fetch circuit FCG produces the control clock signals CT and CM for the register TR and MR, the data, namely the exposure time of the value corresponding to the APEX value obtained by the operation is transferred from the register MR to the register TR, while at the same time, the data, namely the aperture value of the APEX value set is transferred from the register AR to the register MR.

As is explained above the aperture value corresponding to the APEX value Av necessary for obtaining a proper exposure is stored in the registers AR and MR while the exposure time corresponding to the value (Tv+α) corresponding to the APEX value necessary for obtaining a proper exposure is stored in the register TR by means of the CC1 signal.

In the control counter CC, the CC1 signal is given to the AND gates A21 and A22, whereby the AND gate A21 is supplied with the inversed signal of the shutter release signal SHTR by means of the inverter INV1 while the AND gate A22 is supplied with the shutter release signal SHTR. Consequently when the shutter release signal SHTR is "0", the AND gate A21 produces the "1" output to be supplied to the K terminal of the Flip Flop F1 through the OR gate 01 and at the same time to the J input terminal of the Flip Flop F2. In consequence in synchronization with the falling down of the clock pulses CP the Flip Flop F2 produces the Q output of "1" while the Flip Flops F1 and F3 produce the $\overline{Q}$ output of "1", so that the AND gate A12 produces the "1" output, namely the CC2 signal. By means of this CC2 signal the circuit repeats the same operation as mentioned above in such a manner that so far as the shutter release signal SHTR is "0", the control circuit CC produces the control signal CC2, CC3, CC1 in a repeated way including the above mentioned various circuit operations.

Further, when the shutter release button not shown in the drawing is pushed down so as to produce the shutter release signal of "1", at the time point at which the control circuit CC produces the CC1 signal the AND gate A22 produces the "1" output to be supplied to the J terminal of the Flip Flop F3 so that in synchronization of the falling down of the clock pulses CP the Flip Flop F3 produces the Q output of "1" while the Flip Flpps F1 and F3 produce the Q output of "1" and the Flip Flop F2 produces the $\overline{Q}$ output of "1" whereby the AND gate A51 produces "1", namely the CC5 signal.

This control signal CC5 is given to the diaphragm driving means as diaphragm driving signal AD as is shown in FIG. 2, so as to drive the diaphragm not shown in the drawing. At the same time the CC5 signal is given to the analog gate AG4 supplied with the detected aperture value AVR from the aperture detecting means producing an analog value corresponding to the APEX value in accordance with the actual aperture value through the circuit AP in such a manner that the detected aperture value AVR is given to the comparator COM. As mentioned above, the content of the register MR corresponds with AV, the comparator COM is supplied with the content of the register MR, namely the aperture value corresponding to the APEX value necessary for obtaining the proper exposure and converted into an analog value by means of the D - A convertor DA and therefore at the time of starting the diaphragm driving the control aperture value Av is larger than the detected aperture value AVR so that "1" is produced, while after the detected aperture value AVR becomes larger than the control aperture value, "0" is produced. Consequently when the diaphragm is driven up to the position at which the proper exposure is obtained, the output COMP of the comparator COM changes from "1" into "0", whereby this output COMP is given from the terminal T3 of the control counter CC to the AND gate A20 supplied with the control signal CC5 through the inverter INV3 so that the Flip Flop F1 supplied with the output of the AND gate A20 at the K terminal through the OR gate 01 is reset in synchronization with the falling down of the clock pulse CP immediately after the change of the comparator output COMP from "1" into "0", so as to produce the Q output of "0". In consequence the $\overline{Q}$ outputs of the Flip Flops F1 and F2 of the control counter CC are "1", while the Q output of the Flip Flop F3 is "1", so that the AND gate A14 produces the "1" output, namely the control signal CC4, whereby CC5 is "0". Thus the diaphragm driving signal AD is "0" so that the diaphragm driving is suspended in such a manner that the aperture is kept at a value necessary for obtaining the proper exposure.

Namely, by means of the production of the diaphragm driving signal AD the magnets MA and MR shown in FIG. 9 are supplied with current in such a manner that the magnet MR is excited along the reversed direction, whereby the lever 96 is rotated along the clockwise direction by means of the spring 96c and the release lever 98 is rotated along the counter clockwise direction. Thus the lever 99 is rotated along the counter clockwise direction so as to solve the engagement of the sector gear 100. Further by means of the disengagement of the sector gear the ring 91 is rotated along the clockwise direction by means of the spring 91a so that the sector gear 100 is rotated along the clockwise direction against the force of the spring 100c. By means of the rotation of the sector gear the brush Ra moves sliding over the resistance Ra1 so that the resistance Ra1 shown in FIG. 2(e) assumes the value corresponding to the aperture value to be supplied to the comparator COM through the gate AG4 so as to be compared with the aperture value stored in the register MR, whereby when the both voltages coincide with each other, the signal AD changes from "1" into "0". Thus the magnet Ma is not excited any more, the lever 107 to be attracted is rotated along the counter clockwise direction against the force of the spring 108a, the folded part of the lever is engaged with the stop wheel 101c, the rotation of the gear 100 stops, the preset ring 91 is rotated into the position corresponding to the aperture value stored in the register MR and the diaphragm is set at the proper position.

Further the above mentioned control signal CC4 is supplied to the D terminal of the Flip Flop FF whose control clock is the pulses CTO from the circuit PG. the Q output RL of this Flip Flop is given to the exposure time control circuit RTC and at the same time to the AND gate AD supplied with the CC4 signal, whereby the output SO of this AND gate AO is supplied to the magnets MT and Mgs shown in FIG. 9, so as actuated the both magnets. Thus the magnet Mgs with a permanent magnet is excited along the reversed direction, the lever 333 is rotated along the clockwise direction by means of the spring 333a, the front shutter plane gear 334 and the front shutter pinion 335 are rotated and the front shutter plane starts to run.

Hereby the shutter time is controlled by means of the above the mentioned signal RL. Below the operation of the exposure time control circuit will be explained in detail in accordance with the drawings.

Figure 11:
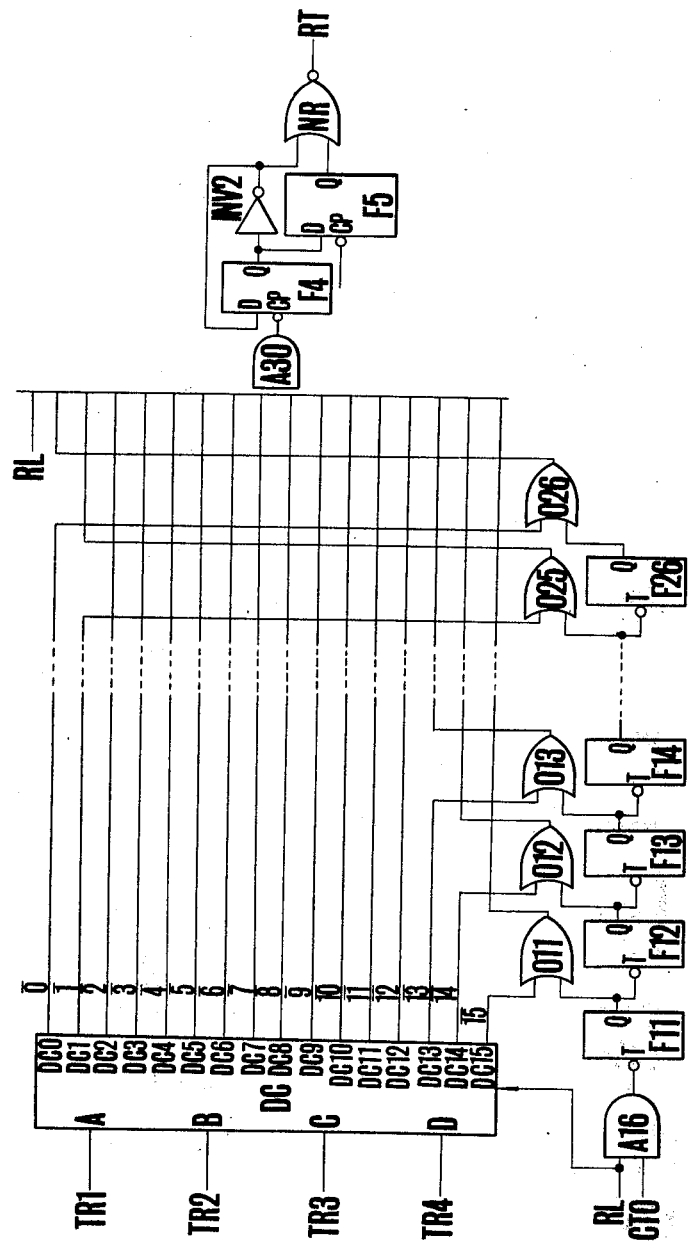
FIG. 11 shows an embodiment of the circuit RTC shown in FIG. 2(a).

FIG. 11 shows the detailed circuit composition of the exposure time control circuit RTC. In the drawing, DC is the decoder supplied with the outputs of the four bits TR1, TR2, TR3 and TR4 of the register TR so as to deliver the decode outputs to the sixteen output lines DC0–DC15, being so designed as to deliver "0" output to a certain determined output line in accordance with the input. The outputs DC0–DC15 of the above mentioned decoder DC are respectively supplied to the AND gate A30 through the OR gates 011–026, whereby the above mentioned OR gates 011–026 are supplied with the output of the frequency dividing circuit to be explained later at the other input terminal. Such frequency dividing circuit consists of sixteen Flip Flops F11–F26 whose Q outputs are respectively supplied to the corresponding OR gates 011–026 and at the same time to the T input of the Flip Flop in the next step.

Hereby to the T input of the Flip Flop F11, the logical product signal of the control signal RL with the output signal CTO of the standard time producing circuit PG is supplied through the AND gate A16. In case of thus composed frequency dividing circuit the standard time pulse CTO to be given to the T input terminal of the Flip Flop F11 through the AND gate A16 is divided into two by means of the Flip Flop F11, and again divided into two by means of the Flip Flop F12. Namely, by supplying the output of a Flip Flop to the T input terminal of the following Flip Flop, the Flip Flop F26 produces a pulse output which is divided into $2^{16}$ in frequency. Namely when a pulse with 1/4096 sec. period is adopted as standard time pulse CTO, the output of the Flip Flop F11 is the pulse with 1/2048 sec. period, the output of the Flip Flop F12 the pulse with 1/1024 sec. period, the output of the Flip Flop F13 the pulse with 1/512 sec. period, the output of the Flip Flop F14 the pulse with 1/256 sec. period, the output of the Flip Flop F15 the pulse with 1/128 sec. period, the output of the Flip Flop F16 the pulse with 1/64 sec. period, the output of the Flip Flop F17 the pulse with 1/32 sec. period, the output of the Flip Flop F18 the pulse with 1/16 sec. period, the output of the Flip Flop F19 the pulse with ½ sec. period, the output of the Flip Flop F20 the pulse with ¼ sec. period, the output of the Flip Flop F21 the pulse with ½ sec. period, the output of the Flip Flop F22 the pulse with 1 sec. period, the output of the Flip Flop F23 the pulse with 2 sec. period, the output of the Flip Flop F24 the pulse with 4 sec. period, the output of the Flip Flop F25 the pulse with 8 sec. period, and the output of the Flip Flop F26 the pulse with 16 sec. period. The output of each Flip Flop is supplied to the other input terminal of the OR gate O11–O26 whose one input terminal is supplied with the output DC0–DC15 of each decoder DC, so that the OR gate supplied with the "0" output of the decoder DC produces the "1" output at the time point at which the output of the Flip Flop is "1", whereby the output of the AND gate A30 supplied with the output of all the OR gates O11–O26 is "1". Namely, the above mentioned AND gate A30 produces the same output as the Q output of a certain specified Flip Flop among those F11–F26 in accordance with the state of the output of the decoder DC. For example when the DC15 output of the decoder is "0", the AND gate A30 produces the same output as the Q output of the Flip Flop F11, when the DC14 output is "0", the AND gate A30 produces the same output as the Q output of the Flip Flop F12, and finally in the same way as above, the $DC_0$ output is "0", the AND gate A30 produces the same output as the Q output of the Flip Flop F26. The output of the AND gate A30 is given to the control clock terminal of the Flip Flop F4, whereby the D-terminal is supplied with "1" from the inverter INV2 so that the Flip Flop F4 is set in synchronization with the falling down of the output of A30 so as to produce the Q output of "1". This "1" output is given to the D-terminal of the Flip Flop F5 whose control clock terminal is supplied with the clock pulse CP in such a manner that the Flip Flop F5 produces the Q output of "1" in synchronization of the falling down of the next clock pulse CP. In consequence, the NOR gate NR which is supplied with the output of the above mentioned inverter INV2 and the Q output of the above mentioned Flip Flop F5 produces the pulse signal RT with a time width from the time point at which the Flip Flop F4 is set, namely the output of the inverter INV2 becomes "0" till the time point at which the Q output of the Flip Flop F5 becomes "1", whereby this signal RT is given to the control counter CC as the output RT of the exposure time control circuit RTC.

Figure 12:
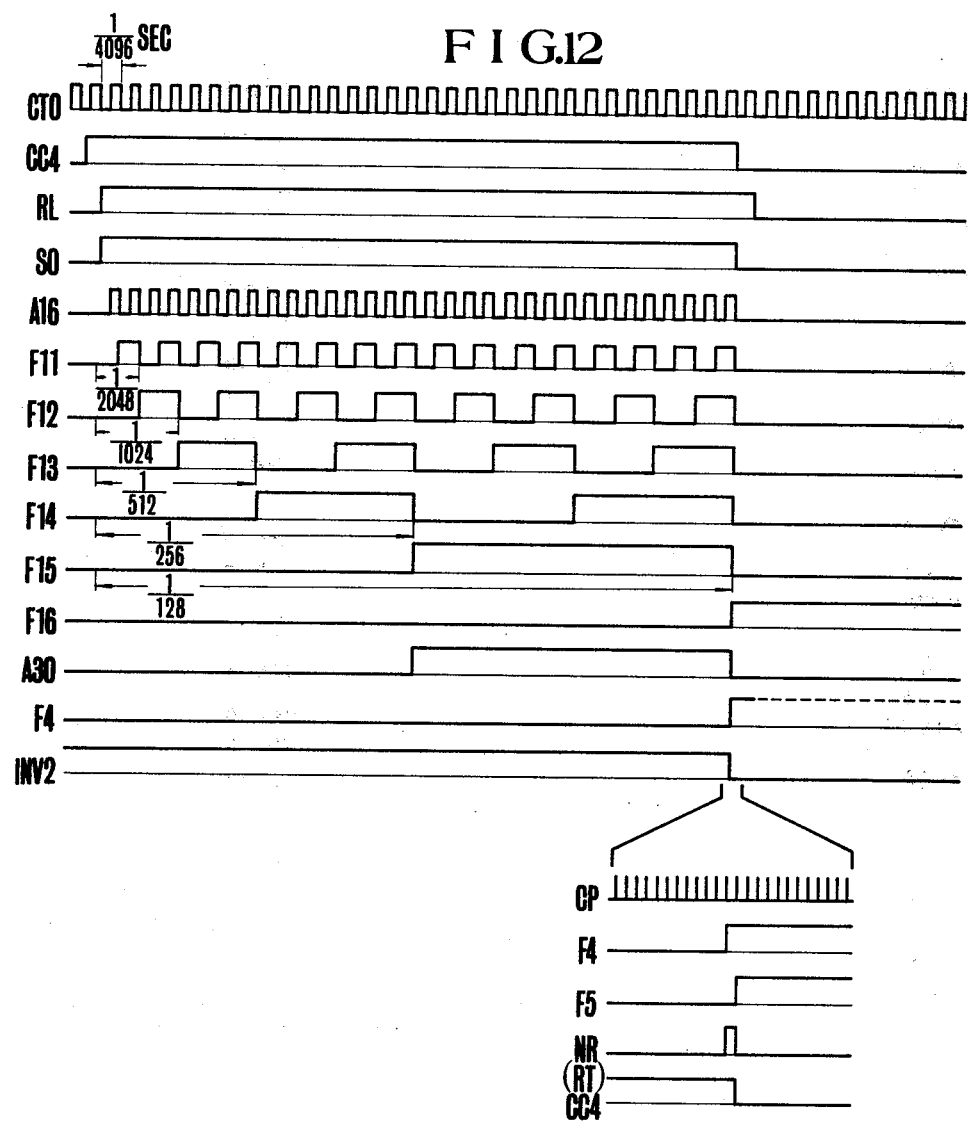
FIG. 12 shows the time chart for explaining the operation of the circuit shown in FIG. 11.

FIG. 12 shows the time chart for explaining the operation of the circuit shown in FIG. 11, whereby the time chart corresponds with the case the digital output TR1 of the register TR is "1", TR2 "1", TR3 "0" and TR4 "1", namely the exposure time control in case the value (Tv+α) corresponding to the APEX value necessary for obtaining the proper exposure stored in the register TR is "11".

In accordance with the output of the register TR, the decoder DC delivers the "1" output to each output line of DC0–DC10, DC12–DC15 and the "0" output to the output line of DC11, whereby the delivery of the output is controlled by means of the RL signal which is the Q output of the Flip Flop FF.

In consequence the output of each OR gate O11, O12–O14, O16–O26, to be given to the AND gate A30 is "1", while the output of the OR gate O15 supplied with the output DC11 of the decoder DC is "0".

On the other hand, as explained above, the RL signal means the start of the exposure, the rising up of the shutter opening signal SO being determined by that of the RL signal, whereby the AND gate A16 supplied with the RL signal starts to produce a pulse signal synchronized with the standard time pulse CTO of 1/4096 sec. As is clear from FIG. 12, the RL signal is "1" in synchronization of the falling down of the standard time pulse CTO by means of the Flip Flop FF, so that as is clear also from FIG. 12 the pulses produced by means of the AND gate A16 fall down in every 1/4096 sec. after the rising up of the RL signal. In consequence the Flip Flop F11 supplied with the output pulse of the AND gate A16 at the T-terminal repeat the setting and the resetting at every falling down of the pulse and therefore produces the pulse output at the Q output terminal in every 1/2048 sec. after the rising up of the RL signal while the Flip Flop F12 supplied with the output pulses of the Flip Flop F11 at the T-terminal repeat the setting and the resetting at every falling down of the pulse and therefore produces the pulse output at the Q output terminal in every 1/1024 sec. after the rising up of the RI signal. In the same way, the Flip Flop F13 produces the pulse output in every 1/512 sec. after the rising up of the RL signal, the Flip Flop F14 the pulse output in every 1/256 sec. and the Flip Flop F15 the pulse output in every 1/128 sec. as is shown in FIG. 12. Further the Flip Flops F16–F26 respectively produce, in the same way, the pulse output in every 1/64 sec., 1/32 sec., 1/16 sec., ⅛ sec., ¼ sec., ½ sec. 1 sec., 2 sec., 4 sec., 8 sec. and 16 sec. after the rising up of the RL signal. The output of each Flip Flop F11–F26 is supplied to the AND gate A30 respectively through the OR gate O11–O26, whereby at the beginning the output of the OR gate supplied with the "0" output of the decoder DC at the terminal produces "0". However, when the Q output of the corresponding Flip Flop becomes "1", the output of the OR gate becomes "1" while the Q output becomes "0", the output of the OR gate becomes "0". In consequence, at the time point at which the output of such OR gate becomes "1", the output of all of the OR gate O11–O26 becomes "1", whereby the output of the AND gate A30 also becomes "1". Namely, the output of the AND gate A30 depends upon the state of the Q output of the Flip Flop delivering Q output to the OR gate supplied with "0" from the decoder DC.

Because only the DC11 output of the decoder DC is "0", the AND gate A30 delivers the same output as the Q output of the Flip Flop F15 delivering the Q output to the OR gate O15 supplied with the DC11 output. In consequence as is clear from FIG. 12, the AND gate A30 delivers the pulse output with the first falling down in 1/128 sec. after the rising up of the signal RL, namely the start of the exposure. In consequence the Flip Flop F4 supplied with the output of the AND gate A30 at the control clock terminal and with "1" at the D-input terminal through the inverter INV2 is set and produces the Q output of "1" as is shown in FIG. 12. At the same time, the output of the inverter INV2 becomes "0". On the other hand, the Flip Flop F5 supplied with the Q output of the above mentioned Flip Flop F4 at the D-input terminal is set in synchronization with the first falling down of the clock pulse CP after the Q output of the above mentioned Flip Flop F4 and produces the Q output of "1", while the NOR gate NR produces the RT signal of the "1" output between the time point at which the Flip Flop F4 is set and produces the Q output of "1" and the time point at which the Flip Flop F5 is set and produces the Q output of "1".

As is clear from FIG. 3, the above mentioned RT signal is delivered to the K-terminal of the Flip Flop F3, so that in synchronization with the falling down of the first clock pulse CP after the RT signal becomes "1", namely with the same timing with the falling down of the RT signal the Flip Flop F3 is reset in such a manner that the CC4 output of the control circuit CC becomes "0".

In consequence, as is clear from FIG. 1, the AND gate AO delivering the exposure signal, namely the shutter opening signal SO in accordance with the AND condition of the RL signal and the CC4 signal produces the output of "0" at the same time with the falling down of the control signal CC4 in such a manner that the magnet MT is not excited any more, whereby the lever 341 is rotated along the clockwise direction by means of the spring 342, the rear shutter plane gear 339 and the pinion 500 are also rotated, the rear shutter plane starts to run and the exposure is terminated.

Figure 13:
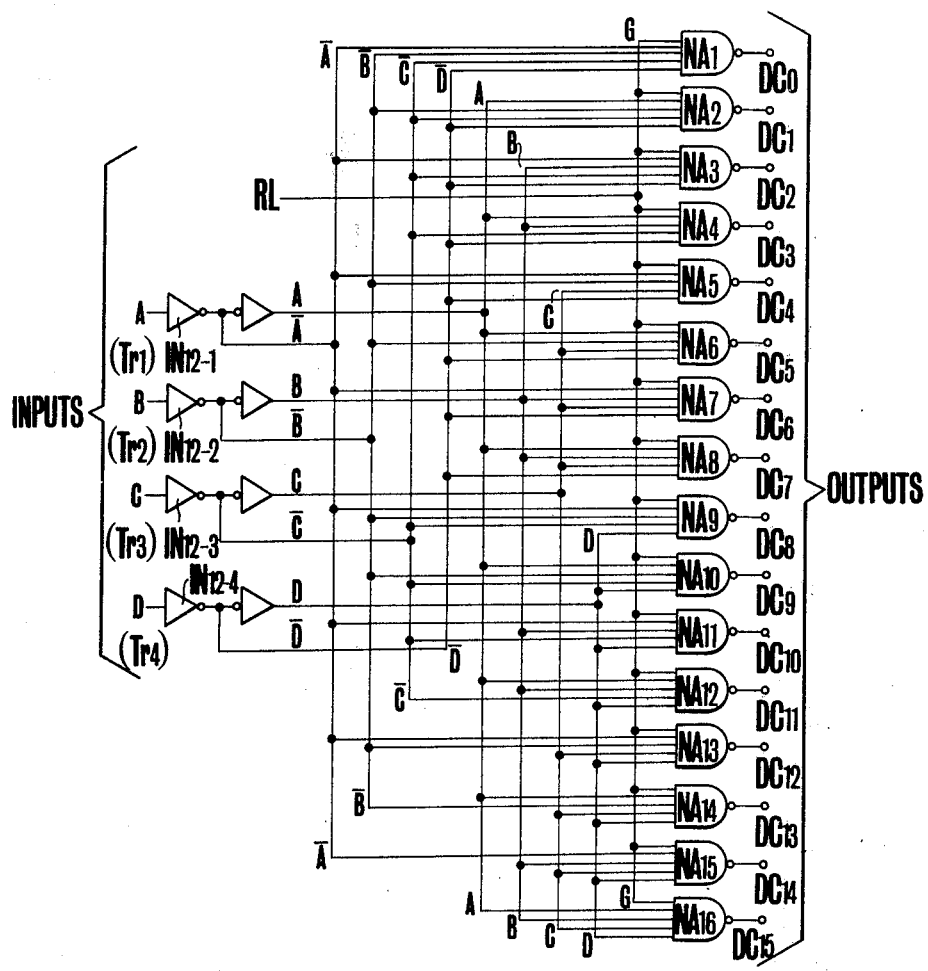
FIG. 13 shows an embodiment of the circuit of the decoder DC shown in FIG. 11.

FIG. 13 shows an embodiment of the circuit of the decoder DC shown in FIG. 11. In the drawing, IN12-1–IN12-4 are inverters, and NA1–NA16 the NAND gates while the decoder itself is an already known 4-line-to-16-line decoder such as SN54154 or SN74154 made by Messrs. Texas Instrument Co., so that its detailed explanation will be omitted here.

As explained above, every operation is carried out by means of the control signal from the control counter CC so as to terminate a series of the exposure control operation.

Figure 14:
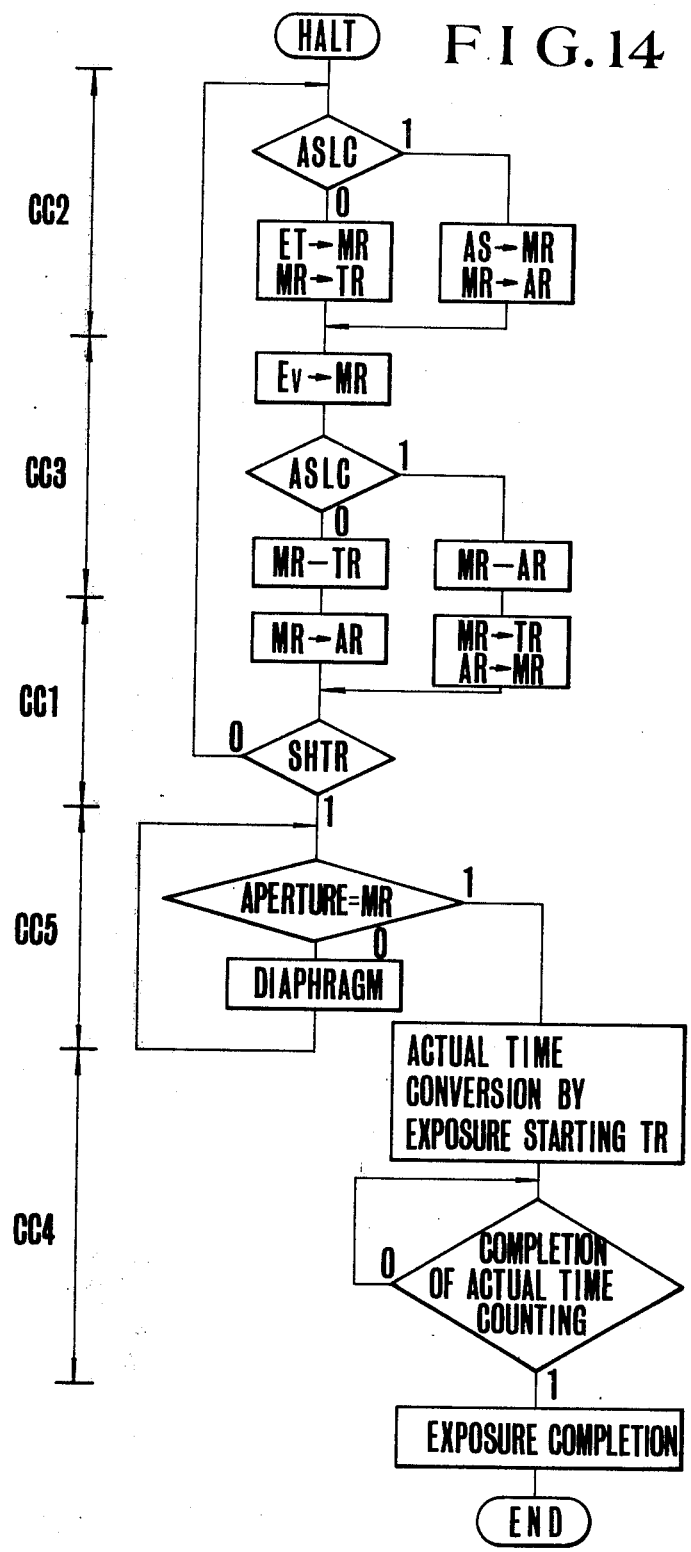
FIG. 14 shows the control glow chart of the automatic exposure control device in accordance with the present invention.

FIG. 14 shows the control flow chart of the automatic exposure control device in accordance with the present invention. Below the automatic exposure control method in accordance with the present invention will be explained according to the flow chart shown in FIG. 14.

Now, in the waiting state HALT, the control counter FC is in the final state in the exposure control in the preceeding step, namely all of the control signal CC0–CC5 are "0", whereby when for example through the film winding up operation the unitial reset signal RESET is delivered to the control counter FC through the terminal T6, the Flip Flops F1 and F3 are brought into the reset state by means of the signal input to the reset direct terminal RD while the Flip Flop F2 is brought into the set state by means of the signal input to the set terminal SD. Namely the control counter CC produces the control signal CC2 in such a manner that a series of the exposure control operation are carried out.

What is important for carrying out the exposure control is to determine which element is to be set with priority. Below the control operation for the exposure time priority mode and the aperture priority mode will be explained in detail.

In case of the exposure time priority mode the analog signal corresponding to the value corresponding to the APEX value of the desired exposure time as is shown in FIG. 1 is delivered from the set exposure time input terminal ET, whereby the signal is set by means of a variable resistance and the like as is explained above. At the same time the aperture priority selection signal $ASLC_1$ is "0" by means of the opening of the switch, which signal is delivered to the exposure time priority display means TI through the inverter INV in such a manner that the photographer learns from the display means that the device is in the exposure time priority mode.

By means of the initial reset signal RESET the control counter CC delivers the control signal CC2, whereby this control signal CC2 is delivered to the ANALOG gate AG2 directly connected to the circuit ET from the AND gate A1 being supplied with the inversed signal "1" of the "0" signal of the aperture priority selection signal ASLC1 through the inverter INV so as to open the ANALOG gate AG2. This operation is the routine for determining whether the ASLC1 in the flow chart shown in FIG. 14 is "0" or "1". At the same time, the control signal CC2 is delivered to the fetch circuit FCG and A-D conversion circuit AD. From the ANALOG gate AG in the opened state the analog value corresponding to the value corresponding to the APEX value of the set exposure time signal is delivered to the comparator COM while at the same time the A-D conversion circuit AD starts to convert the analog value into a digital value. The above mentioned A-D conversion circuit AD composes the conventional successive approximation type A-D conversion circuit, whereby the output line with the weight of "8" delivers the "1" output to the register MR through the gate circuit GA. At this time, as is clear from the timing chart shown in FIG. 10, the register MR is supplied with the control clock signal CM synchronized with the clock pulse CP in such a manner that the register MR takes up the "1" output of the signal line and delivers the "1" output from MR4. Such output of the register MR is converted into an analog value (corresponding to "8" in the present case) by means of the D-A conversion circuit DA and then delivered to the above mentioned comparator COM by means of which whether the analog value given through the ANALOG gate AG2 is larger or smaller than "8" is determined. In case the input analog value is smaller than "8", the comparator COM produces the "1" output to be given to the A-D conversion circuit AD whereby the output of MR4 is changed from "1" into "0". When the input analog value is larger than "8", the output of the comparator COM is "0" in such a manner that the output "0" of the MR4 set by means of the A-D conversion circuit AD remains "1". Then the above A-D conversion circuit AD delivers the "1" output from the output line with the weight "4", which output is delivered to the register MR through the gate circuit GA. As explained above the output of the register MR is converted into an analog value by means of the D-A conversion circuit DA and then delivered to the above mentioned comparator COM by means of which whether the analog value given through the ANALOG gate AG is larger or smaller than "4" is determined. When the content of the register MR is smaller, the comparator delivers the "1" output in such a manner that the output of MR3 set by means of the A-D conversion circuit AD is changed from "1" into "0". After then in the same way each output line delivers "1" successively so as to repeat the same operation in such a manner that the digital value taken up in the register MR is brought as close to the analog value given through the ANALOG gate AG2 as possible so as to terminate the A-D conversion. This operation corresponds with the routine ET→MR in the flow chart shown in FIG. 14.

After the above mentioned operation, the register MR comes to obtain a digital value corresponding to the input analog value, namely the A-D conversion is terminated, when the A-D conversion circuit AD delivers the END signal to be delivered to the control counter CC and the fetch circuit FCG.

The fetch circuit FCG supplied with the above mentioned END signal delivers the control clock CT as is shown in the chart shown in FIG. 10 in such a manner that the content of the register MR, namely the digitally converted value of the set exposure time is transferred to the register TR.

As explained above, the set exposure time transferred to the register TR in a digital value corresponding to the APEX value is decoded and displayed by means of the display means DISP1.

The above mentioned process corresponds with the routine MR→TR in the flow chart shown in FIG. 14.

On the other hand because in synchronization with the falling down of the above mentioned END signal the Flip Flop F1 is set, the control circuit CC starts to delivers the control signal CC3 which signal is given to the ANALOG gate AG1 so as to open the gate in such a manner that the analog signal corresponding to the APEX value of the exposure amount as is shown in FIG. 1 is supplied to the comparator COM through the gate. At the same time, the control signal CC3 is delivered to the A-D conversion circuit AD, whereby the analog information delivered through the ANALOG gate AG1, namely the exposure amount information is converted into a digital value by means of the same process as explained above and then stored in the register MR. This process corresponds with the rontine ES→MR in the flow chart shown in FIG. 14. On the other hand, the fetch circuit delivers the control clock CM to the register MR as is shown in FIG. 10 while the routine ES→MR is carried out.

When after the above mentioned operation the A-D conversion of the exposure amount has been completed, the A-D conversion circuit AD delivers the END signal, which signal is delivered to the subtraction circuit SUB through the AND gate A4 supplied with the control signal CC3. ON the other hand, the selection circuit is supplied with the "0" signal from the aperture priority selection means ASLC, so that the digital data of the register TR is delivered selectively to the subtraction circuit SUB which is at the same time supplied with the digital data of the register MR in such a manner that by means of the subtraction circuit SUB the content of the register TR is subtracted from that of the register MR and the result in stored in the register MR. This process corresponds with the routine MR→TR in the flow chart shown in FIG. 14.

By means of the above mentioned operation the exposure time in the APEX value $(Tv+\alpha)$ (APEX value Tv compensated by $\alpha$) is subtracted from the exposure amount in the APEX value $(Ev+a)$ (APEX value Ev compensated by $\alpha$) $\{Ev+\alpha-(Tv+\alpha)\}=Ev-Tv$, whereby by means of the conventional APEX operation $Ev-Tv=Av$ the aperture value in APEX value Av is obtained.

On the other hand, in synchronization of the falling down of the END signal the Flip Flop F2 is reset, the control counter CC supplied with the END signal delivers the output CC1, which signal is delivered to the fetch circuit FCG, which produces the control clock as is shown in FIG. 10, to be given to the register AR. In consequence the aperture value obtained in the register MR as the result of operation comes to be stored in the register AR. At this time point the aperture value obtained as the result of operation is decoded by the display means DISP2 and displayed in a digital way. This process corresponds with the routine MR→AR in the flow chart shown in FIG. 14.

At this time, the aperture value in APEX value obtained as the result of the operation is stored in the register AR and MR while the set exposure time in a value equivalent to the APEX value is stored in the register TR in a digital value.

The above mentioned control signal CC1 is delivered to the AND gate A21 and A22 of the control counter CC, whereby the AND gate A22 is supplied with the shutter release signal SHTR while the AND gate A21 is supplied with the inverted signal of the shutter release signal SHTR by means of the shutter release signal SHTR, so that when the shutter release is not carried out namely the shutter release signal SHTR is "0", the output of the AND gate A21 is "1", whereby the Flip Flop F1 is reset while the Flip Flop F2 is set in such a manner that the output of the control counter CC is CC2 and the control flow repeats the same process as mentioned above again, while on the other hand, when the shutter release is carried out, namely the shutter release signal SHTR is "1", the output of the AND gate A22 is 1, whereby the Flip Flop F3 is set so that the output of the control counter CC is CC5. This process corresponds with the routine for determining whether SHTR is "0" or "1" in the flow chart shown in FIG. 14.

As mentioned above so far as the shutter release is not carried out, the light measurement as well as the operation process is repeated, while once the shutter is released the control counter CC produces the control signal CC5 so as to start the diaphragm driving operation. Namely the control signal CC5 serves as the diaphragm driving signal AD. At the same time the above mentioned control signal CC5 is delivered to the ANALOG gate AG4 in such a manner that the analog value corresponding to the APEX value of the aperture of the diaphragm driven is delivered to the one input terminal of the comparator COM through the detected aperture value input terminal. On the other hand, from the register MR the above mentioned comparator COM is supplied with the digital value converted into the analog value by means of the D-A converter DA, corresponding with the APEX value of the aperture value obtained by the operation for controlling, whereby at the time point at which the detected aperture value becomes larger than the control aperture value, the comparator COM produces the "1" output to be delivered to the control counter CC. In case of the control counter CC, the "1" signal as the output of the above mentioned comparator COM is delivered to the K-input terminal of the Flip Flop F1 through the OR gate O1 and the AND gate A21 supplied with the control signal CC5 so that the Flip Flop F1 is reset whereby the output of the control counter CC is CC4.

The above mentioned control signal CC4 is supplied to the K-input terminal of the Flip Flop FF as is shown in FIG. 2 and converted into the exposure time control signal RL obtained in synchronization with the first falling down of the standard time pulse CTO delivered from the standard time generating circit PG. The above mentioned exposure time control signal RL is given to the AND gate AO supplied with the control signal CC4 and the exposure time control circuit RTC, whereby the AND gate AO delivers the shutter opening signal SO for opening the shutter for exposure so as to start the exposure to the film plane. On the other hand, the exposure time control circuit RTC counts the timing, as is explained in accordance with FIG. 11 and FIG. 12, in accordance with the digital value corresponding to the APEX value of the exposure time delivered from the register TR, whereby after the elapse of a certain determined time the exposure time control circuit RTC produces the exposure completion signal RT in such a manner that the control counter CC supplied with the signal stops delivery the control signal CC4, the Flip Flop F3 being reset. Namely, the output of the AND gate AO shown in FIG. 1, namely the shutter opening signal SO falls down so as to terminate the exposure to the film plane. This process includes the exposure starting, the actual time conversion of the exposure time data of the register TR, the determination whether the actual time counting is completed or not, and the exposure completion in the flow chart shown in FIG. 14.

When on the other hand, the control counter produces no CC4 output any more, the Flip Flop F3 being reset, all of the outputs CC1–CC5 become "0", whereby the waiting state is resumed again and the exposure to the film plane is completed with the proper exposure amount.

In case the exposure time is selected with priority, in accordance with the above mentioned processes the aperture value is automatically operated in a digital way while a proper exposure amount can be obtained with the set exposure time and the operated aperture value.

Further in case of the aperture priority mode the analog signal corresponding with the APEX value, as is shown in FIG. 1, of the desired aperture value is delivered to the set aperture value input terminal AS, being set by means of a variable resistance or the like as has being explained before. At the same time by the closure of the switch the aperture priority selection signal ASLC, becomes the "1" signal to be delivered to the aperture priority display means AI by means of which the photographer learns that the device is in the exposure time priority mode.

By means of the initial reset signal RESET the control counter FC produces the control signal CC2 to be delivered to the ANALOG gate AG3 directly connected to the circuit AS from the AND gate A2 supplied with the "1" signal of the aperture priority selection signal $ASLC_1$ so as to open the gate AG3. This process corresponds with the routine for $ASLC_1$ to distinguish "0" from "1" in the flow chart shown in FIG. 14. The control signal CC2 is delivered to the fetch circuit FCG and the A-D conversion circuit AD. The ANALOG gate AG2 in the opened state delivers the set aperture value signal in an analog value corresponding to the APEX value to the comparator COM, whereby at the same time the A-D conversion circuit AD start the A-D conversion of the analog value. The above mentioned A-D conversion circuit composes a conventional successive approximation type A-D conversion circuit, whose operation has already been explained. The above mentioned process corresponds with the routine AS→MR in the flow chart shown in FIG. 14.

By means of the above mentioned process a digital value corresponding with the input analog value is obtained in the register MR namely the A-D conversion is completed, when the A-D conversion circuit AD delivers the END signal to be given to the control counter CC and the fetch circuit FCG.

The fetch circuit FCG supplied with the above mentioned END signal produces a control clock CA as is shown in the flow chart shown in FIG. 10 in such a manner that the content of the register MR, namely the set aperture value converted into a digital value is transferred to the register AR.

The set aperture value stored in the register AR in a digital value corresponding to the APEX value as mentioned above is decoded and displayed by means of the display means DISP2.

The above mentioned process corresponds with the routine MR→AR in the flow chart shown in FIG. 14.

Because on the other hand the Flip Flop F1 is set in synchronization with the falling down of the above mentioned END signal, the control counter CC starts to produce the control signal CC3 to be delivered to the ANALOG gate AG1 so as to open the gate AG1, whereby an analog signal corresponding to the APEX value of the exposure amount as is shown in FIG. 1 is delivered to the comparator through the gate. At the same time, the control signal CC3 is delivered to the A-D conversion circuit AD in such a manner that the analog information, namely the exposure amount information supplied through the ANALOG gate AG1 is converted into a digital value in the same way as mentioned above so as to be stored in the register MR. This process corresponds with the routine ES→MR in the flow chart shown in FIG. 14. During the routine process ES→MR the register MR is supplied with the control clock CM as is shown in FIG. 10.

When the A-D conversion of the exposure amount has been completed by means of the above mentioned operation, the A-D conversion circuit AD produces the END signal to be delivered to the subtraction circuit SUB through the AND gate A4 supplied with the control signal CC3. On the other hand, the selection circuit SEL is supplied with the "1" signal from the aperture priority selection means ASLC so as to deliver the digital data in the register AR selectively to the subtraction circuit SUB whereby the content of the register AR is subtracted from the content of the register MR in the subtraction circuit SUB supplied with the digital data in the register MR in such a manner that the result is stored in the register MR. This process corresponds with the routine MR→AR in the flow chart shown in FIG. 14.

By means of the above mentioned process the aperture value Av in APEX value is subtracted from the exposure amount EV+α in APEX value (the APEX value compensated with α) (Ev+α−Av)=(Ev−Av)+α in such a manner that from the APEX equation Ev−Av=Tv, the exposure time (Tv+α) in APEX value (APEX value compensated with α) can be obtained.

Because on the other hand the Flip Flop F2 is reset in synchronization of the falling down of the END signal, the control counter CC produces the output of CC1 to be delivered to the fetch circuit FCG which produces, as is shown in FIG. 10, the control clock CT to be delivered to the register AR. In consequence the exposure time in APEX value obtained in the register MR as the result of operation is stored in the register TR. At this time point the exposure time obtained as the result of operation is decoded and displayed by means of the display means $DISP_1$ in a digital way. On the other hand, the above mentioned control signal CC1 is given to the load circuit LO through the AND gate A3 supplied with "1" of the aperture priority selection signal ASLC while the content of the register AR led out through the selection circuit SEL is transferred to the register MR. This process corresponds with the routine MR→TR, AR→MR in the flow chart shown in FIG. 14.

At this time point, the set aperture value in APEX value is stored in the registers AR and MR in a digital value while the exposure time in APEX value obtained by means of the operation is stored in the register TR in a digital value. After the above mentioned process the state of each register becomes same as that in case with priority on exposure time in such a manner that until the shutter is released, the control counter CC produces the control signals CC2, CC3, CC1 repeatedly in this sequence so that the light measuring, the operation and the storage in the registers are repeated.

Also in case the shutter is released, the aperture is controlled in accordance with the data in the register MR, namely the set aperture value by means of the control signal CC5 and then the exposure time is controlled in accordance with the data in the register, namely the exposure time value obtained by the operation by means of the control signal CC4 quite in the same way as in case with priority on the exposure time.

Figure 2G:
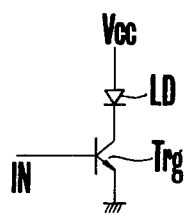
FIG. 2(g) shows an embodiment of the circuits TI and AI shown in FIG. 2(a).

As to the display of the priority on the aperture value or that on the shutter time, when the switch ASLC shown in FIG. 2(a) is opened, namely in case with priority on the shutter time "1" is applied to the circuit TI, while when the switch ASLC is closed, namely in case with priority on the aperture value "1" is applied to the circuit AI in such a manner that the transistor Trg of the circuit AI or the circuit TI shown in FIG. 2(g) is brought in the switched on state so as to actuate the illustrating diode so that the then photographic mode can be recognized.

Figure 15A:
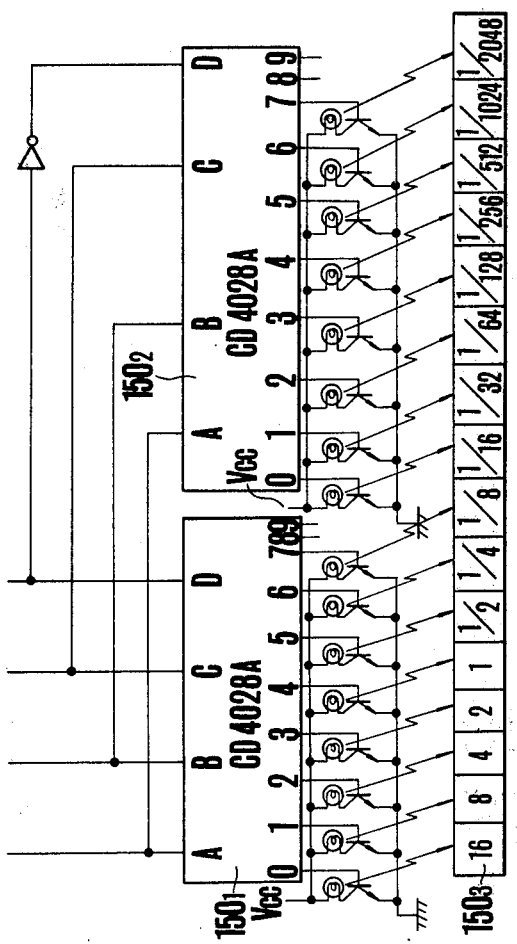
FIGS. 15 (a) and (b) respectively show an embodiment of the display circuit $DISP_{1,2}$ shown in FIG. 2(a).
Figure 15B:
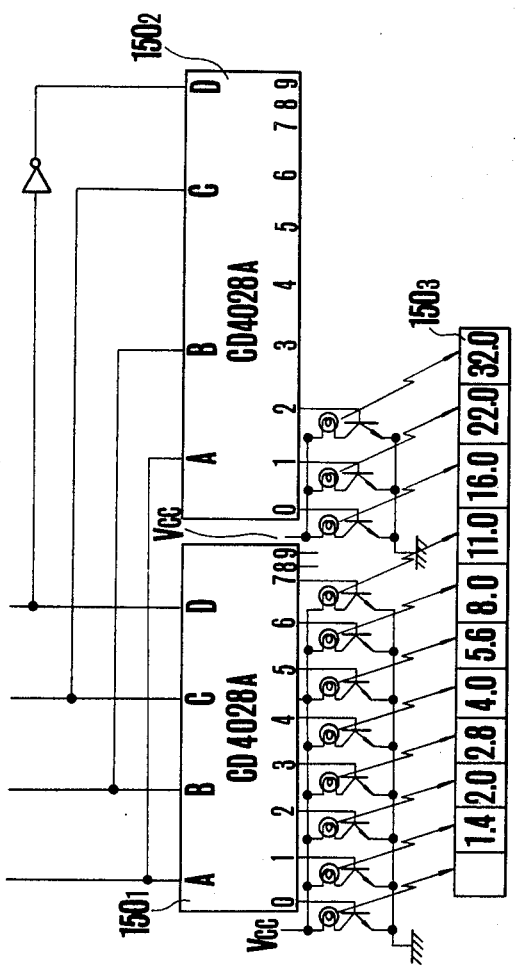

FIG. 15(a) and (b) respectively show an embodiment of the display circuit DISP$_{1,2}$ shown in FIG. 2(a). In FIG. 15(a), 150$_1$ and 150$_2$ are the decoders whereby the input terminals are respectively connected to the corresponding output terminals of the above mentioned register TR in such a manner that the content of the register TR is decoded whereby the output corresponding to the content of the register TR is made "1" and one of the transistors connected to the output terminals is brought in the switched on state so as to light the lamp for illuminating the transparent display body on which the shutter time values are printed and display the content of the register TR. The embodiment shown in FIG. 15(b) presents the similar composition as that shown in FIG. 15(a), whereby the content of the register AR shown in FIG. 2(a) is displayed.

As explained above in accordance with the present invention a novel automatic exposure control device can be obtained, whereby the composition is simplified by carrying out the setting of the exposure amount, the setting of the exposure time and the aperture value and exposure control in an analog way, the accuracy as well as the stability of the operation can be obtained by carrying out the operation for the exposure control and the storage of the data and the switching over between the exposure time priority mode and the aperture value priority mode can be carried out easily without modifying the mechanical composition of the device.

It enables the application of the variable resistance and so on to carry out the setting of various photographic information in an analog way so that the composition can be remarkably simplified, it contributes much to the superior accuracy and stability to carry out the operation as well as the storage in a digital way while the storage, the accuracy and the stability of the condenser are inferior in case of the analog operation and it enables the handling of the exposure time and the aperture value as equivalent data to store the exposure time or the aperture value in digital values or to control the exposure in accordance with the exposure time or the aperture value stored in digital values so that the switching over between the exposure time priority mode and the aperture priority mode can be carried out remarkably easily, which is quite profitable.

Further as explained above the exposure control operation is carried out in sequence without using CPU so that a cheap device can be offered while it is so designed that a plural number of the exposure informations can be converted into digital values by means of a single A-D converter so that in this respect an economically profitable device can be offered.

What is claimed is:

1. A control circuit for a camera, comprising: a light sensor for producing an analog output corresponding to an intensity of light, an A-D converter coupled to the light sensor for converting the analog output from the sensor into a digital value and for producing a conversion completion signal when the A-D conversion is completed, shutter release operating means for initating a shutter release operation, release signal forming means coupled to said operating means for producing a release signal in response to the operation of the operating means, an exposure control circuit coupled to the converter and responsive to the digital output for controlling an exposure on the basis of a digital output, and, an electric control circuit having a first input terminal connected to said converter and responsive to the completion signal, a second input terminal connected to said release signal forming means, a third input terminal, a first output terminal coupled to said converter, a second output terminal connected to said third input terminal, and a third output terminal for producing a third output signal for transmitting an exposure initiating signal, said electric control circuit having an initial condition when no signals are applied to said inputs in which a converter enabling signal appears at the first output terminal for initiating analog-to-digital conversion, said control circuit responding to a conversion completion signal at said first input by eliminating the enabling signal at said first output and producing a signal at said second output, said signal at said second output appearing at said third input for enabling said control circuit to transmit an exposure initiating signal at said third output terminal when a release signal appears at said second input terminal, said circuit returning to the initial condition at which a conversion initiating signal appears at the first output terminal if no release signal appears at the second input terminal while a completion signal appears at the first input terminal.

2. A control as in claim 1, wherein, said electric control circuit includes gate means and circuit means said circuit means having said first input terminal and said three output terminals as well as first and second circuit inputs, said gate means having said second and third input terminals and a gate output terminal, said gate output terminal being connected to said first circuit input, said gate means being an AND gate, said second output terminal being connected to said second circuit input for recycling said control circuit to its initial condition in response to absence of simultaneous conversion completion and release signals.

3. A photographic control circuit for a camera comprising:
   a light measuring circuit for producing an analog output corresponding to the intensity of light;

an A-D converter coupled to the light measuring circuit for converting the analog output from said light measuring circuit into a digital output and for producing an A-D conversion completion signal when the A-D conversion is completed;

operating means for initiating a shutter release operation;

release signal forming means coupled to said operating means for producing a release signal in response to the operation of said operating means;

an exposure control circuit coupled to the A-D converter for controlling an exposure on the basis of the digital output; and an electric control circuit having a plurality of input terminals and a plurality of output terminals for sequentially producing shutter enabling signals including at least a first output terminal to generate a signal for initiating A-D conversion action and a second output terminal to produce a signal for enabling a release action, and a plurality of output terminals for sequentially producing signals for exposure control action, enables A-D conversion with the signal from said first output terminal and disables conversion while producing an output at the second output terminal in response to said A-D conversion completion signal, said second output terminal being connected to the input terminals, and when said release signal forming means is operated said circuit sequentially producing exposure control signal in response to the signal from the second output terminal and to the signal from the release signal forming means, said circuit producing the signal for re-enabling the converter responding to a signal from the second output terminal when the release signal is absent.

4. A photographic control circuit for a camera comprising a light measuring circuit for producing an analog output corresponding to the intensity of light;

an exposure information value forming circuit for producing an analog output corresponding to a preset exposure value;

an A-D converter for converting the analog output into digital output, and for producing an A-D conversion completion signal upon completion of the A-D conversion operation;

first gate means coupled to the measuring circuit and the converter for connecting the output of light measuring circuit to the A-D converter;

a second gate means coupled to the exposure value forming circuit and the converter for connecting the output of exposure value forming circuit to the A-D converter;

an exposure control circuit for controlling an exposure on the basis of the intensity of light and the present exposure value; and a sequence control circuit having at least a first output terminal connected to said first gate means for producing a first signal to connect the output of the light measuring circuit to the A-D converter, a second output terminal connected to said second gate for producing a second signal to connect the output of the exposure value forming circuit to the A-D converter, and a third output terminal for producing a third signal to control the exposure operation, said sequence control circuit having at least a first input terminal for receiving the A-D conversion completion signal and a gate circuit, said gate circuit being connected to said second output terminal, wherein said gate circuit produces a first input signal in response to the second signal and A-D conversion completion signal, and said circuit sequentially produces a first signal and a second signal in response to the A-D conversion signal and the third signal in response to the first input signal.

5. A photographic control circuit for a camera comprising:

a light measuring circuit for producing an analog output corresponding to the intensity of light;

an A-D converter for converting the analog output from said light measuring circuit into a digital output and for producing an A-D conversion completion signal when the A-D conversion is completed;

operating means for initiating a release operation;

release signal forming means for producing a signal in response to the operation of said operating means;

an exposure control circuit for controlling an amount of exposure based on the digital output corresponding to the intensity of light; and a sequence control circuit including;

a plurality of input terminals including a first input terminal connected to the release signal forming means;

a plurality of flip-flops, set states of which are determined respectively in accordance with the input signals applied to the predetermined input terminals, the flip-flops varying to other set states from their initial states with a predetermined sequence in response to the input signals; and a logic circuit having a plurality of output terminals, said logic circuit producing an output at a predetermined output terminal in accordance with the set state of the flip-flops, and said output terminals including a first output terminal connected to said A-D converter for performing the A-D conversion operation of the A-D converter and a second output terminal connected to the input terminal for feeding back the sequence control state of the sequence control circuit to determine a next sequence control state, and a third output terminal for controlling the exposure defining operation, said sequence control circuit sequentially producing an output at the first output terminal for conversion of the output from the light measuring circuit into digital value and changes the output to a next state in response to the A-D conversion completion signal, said sequence control circuit producing an output at the second output terminal for determining a next sequence control state, said flip-flops returning to their original states in response to the output from the second output terminal when said operating means is not operated and producing an output at the third output terminal in response to the signal from said release forming means and the output from the second output terminal.

6. A photographic control circuit for a camera according to claim 1, in which said electric control circuit includes a plurality of flip-flops and the set states of the flip-flops are determined in accordance with the input signals, said set states of the flip-flops changing to the set states every time the input signals change from the initial state, and said circuit producing an output at a predetermined output terminal in accordance with the set state of the flip-flops.

7. A photographic control circuit for a camera according to claim 2, in which said electric control circuit includes a plurality of flip-flops and the set states of the flip-flops are determined in accordance with the input signals, said set states of the flip-flops changing to next set states every time the input signals change from the initial state, and said circuit producing an output at a predetermined output terminal in accordance with the set state of the flip-flops.

8. A photographic control circuit for a camera according to claim 5, in which said sequence control circuit includes a gate means input terminal of which is connected to the second output terminal, and the output terminal of the gate means is connected to the flip-flops, said gate means producing an output signal in response to the signal from the release signal forming means and to the output from the second output terminal, the output at the third output terminal being produced in response to the output signal from the gate means.

* * * * *